(12) United States Patent
Lee et al.

(10) Patent No.: US 9,191,167 B2
(45) Date of Patent: Nov. 17, 2015

(54) METHOD AND BASE STATION FOR TRANSMITTING DOWNSTREAM LINK DATA, AND METHOD AND USER DEVICE FOR RECEIVING DOWNSTREAM LINK DATA

(71) Applicant: LG Electronics Inc., Seoul (KR)

(72) Inventors: Moon II Lee, Anyang-si (KR); Jae Hoon Chung, Anyang-si (KR); Hyun Soo Ko, Anyang-si (KR); Seung Hee Han, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/645,029

(22) Filed: Mar. 11, 2015

(65) Prior Publication Data

US 2015/0188679 A1 Jul. 2, 2015

Related U.S. Application Data

(63) Continuation of application No. 13/522,892, filed on Aug. 2, 2012, now Pat. No. 9,008,071.

(60) Provisional application No. 61/296,389, filed on Jan. 19, 2010, provisional application No. 61/320,331, filed on Apr. 2, 2010.

(30) Foreign Application Priority Data

Jan. 4, 2011 (KR) .................. 10-2011-0000470

(51) Int. Cl.
*H04L 5/00* (2006.01)
*H04J 13/16* (2011.01)
*H04J 13/00* (2011.01)
*H04J 13/18* (2011.01)
*H04L 27/26* (2006.01)

(Continued)

(52) U.S. Cl.
CPC ........... *H04L 5/0026* (2013.01); *H04J 13/0003* (2013.01); *H04J 13/16* (2013.01); *H04J 13/18* (2013.01); *H04L 5/0051* (2013.01); *H04L 5/0053* (2013.01); *H04L 27/2649* (2013.01); *H04J 2011/0006* (2013.01); *H04J 2211/005* (2013.01); *H04L 5/0007* (2013.01); *H04W 88/06* (2013.01)

(58) Field of Classification Search
CPC ... H04L 5/0007; H04L 5/0023; H04L 1/0083; H04L 5/0016; H04L 5/0053; H04W 72/0466; H04J 2011/0006; H04B 7/0617
See application file for complete search history.

(56) References Cited

U.S. PATENT DOCUMENTS

| 2008/0080560 A1 | 4/2008 | Inoue et al. ............... 370/491 |
| 2011/0235730 A1 | 9/2011 | Noh et al. .................. 375/260 |

(Continued)

OTHER PUBLICATIONS

LG Electronics, "DM-RS Design for rank 5-8", 3GPP TSG RAN WG1 Meeting #58bis, Jeju, Korea, Nov. 9-13, 2009, R1-094784.

(Continued)

*Primary Examiner* — Raj Jain
(74) *Attorney, Agent, or Firm* — Dentons US LLP

(57) ABSTRACT

The present invention relates to a method and apparatus which transmit/receive at least one demodulation reference signal by using a CDM group and/or a transmission rank of a user device that have been used to transmit the at least one demodulation reference signal for the user device, an OCC that has been used to spread the demodulation reference signal, etc. Also, the present invention relates to a method and apparatus which change an antenna port for transmitting the demodulation reference signal by using NDI for a disabled transmission block.

16 Claims, 14 Drawing Sheets

(51) Int. Cl.
*H04J 11/00* (2006.01)
*H04W 88/06* (2009.01)

(56) References Cited

U.S. PATENT DOCUMENTS

2012/0033643 A1  2/2012  Noh et al. .................... 370/335
2013/0034178 A1  2/2013  Hu et al. ....................... 375/267

OTHER PUBLICATIONS

LG Electronics, "DM-RS design on extended CP for Rel-9 Dual-layer beamforming", 3GPP TSG RAN WG1 Meeting #59bis, Jeju, Korea, Nov. 9-13, 2009, R1-094780.

Research in Motion, UK Limited, "Control signal design for rel-9 dual-layer BF transmission", 3GPP TSG RAN WG1 Meeting #57bis, Los Angeles, California, Jun. 29-Jul. 3, 2009, R1-092412.

FIG. 11
(a)
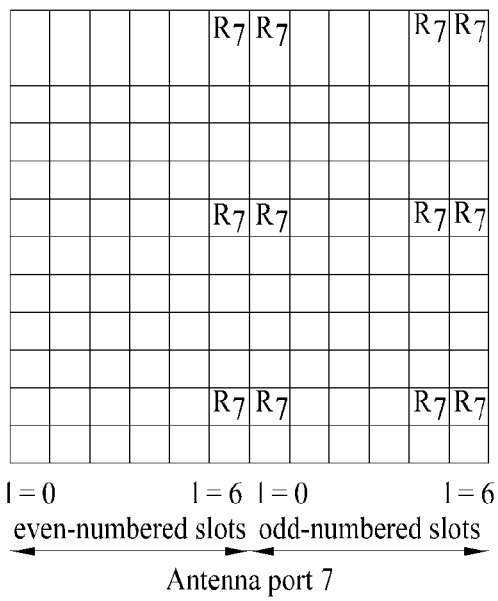
Antenna port 7
(b)
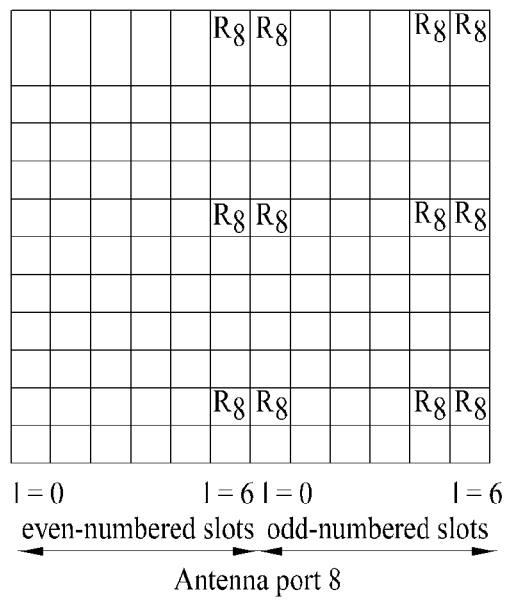
Antenna port 8
(c)
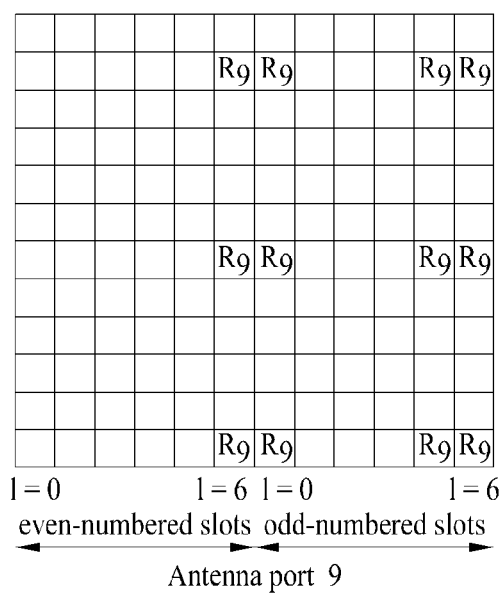
Antenna port 9
(d)
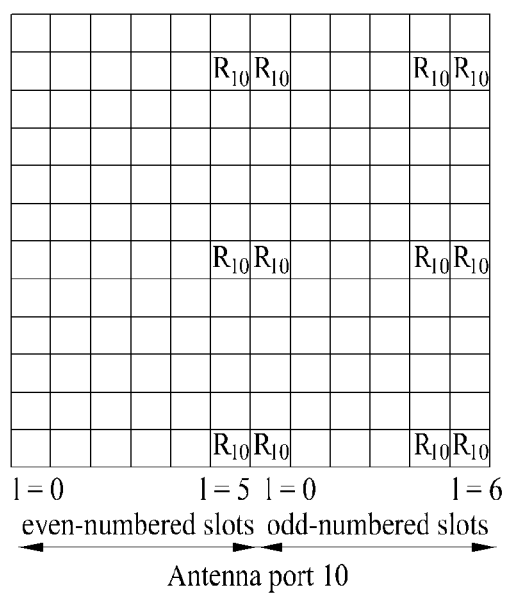
Antenna port 10

METHOD AND BASE STATION FOR TRANSMITTING DOWNSTREAM LINK DATA, AND METHOD AND USER DEVICE FOR RECEIVING DOWNSTREAM LINK DATA

This application is a continuation of application Ser. No. 13/522,892, filed Aug. 2, 2012, which claims the benefit of 35 U.S.C. §371 National Stage Entry of International Application No. PCT/KR2011/000072, filed Jan. 7, 2011 and claims the benefit of U.S. Provisional Application Nos. 61/296,389, filed Jan. 19, 2010, 61/320,331, filed Apr. 2, 2010, and Korean Application No: 10-2011-0000470, filed Jan. 4, 2011, all of which are incorporated by reference in their entirety herein.

FIELD OF THE INVENTION

The present invention relates to a wireless communication system, and more particularly to a method and apparatus for transmitting/receiving downlink data, and a method and apparatus for indicating and/or detecting a reference signal for demodulation of the downlink data.

BACKGROUND ART

Recently, in order to maximize the performance of the wireless communication system and the communication capacity, Multiple Input Multiple Output (MIMO) systems have been drawing a great deal of attention. The MIMO technology corresponds to an evolved version of the conventional communication technology using a single transmission antenna and a single reception antenna, and the MIMO technology applies multiple transmission antennas and multiple reception antennas, so as to enhance the transmitted and/or received (or transceived) data transmission efficiency. The MIMO technology applies the technology of receiving a plurality of segmented data fragments being transmitted through multiple antennas and completing the received message by grouping the collected data fragments, instead of relying on a single antenna path, in order to receive a single full message. As a result, the data transmission rate may be enhanced within a predetermined range, or a system range may be increased with respect to a specific data transmission rate.

The MIMO technology may include transmit diversity, spatial multiplexing, and beamforming. Herein, transmit diversity corresponds to a technology of transmitting the same type of data through multiple transmission antennas, so as to enhance the transmission reliability. Spatial multiplexing corresponds to a technology of having different types of data being transmitted at the same time through multiple antennas, thereby being capable of transmitting data at a fast transmission rate, without having to increase the system bandwidth. Moreover, beamforming is used for increasing an SINR (Signal to Interference plus Noise Ratio) of a signal by adding a weight respective to a channel state (or status) in a multiple antennas system. At this point, the weight may be expressed as a weight vector or a weight matrix, and this may also be referred to as a precoding vector or a precoding matrix.

Spatial multiplexing may include spatial multiplexing respective to a single user and spatial multiplexing respective to a plurality of users. Accordingly, spatial multiplexing may also be referred to as a single user MIMO (SU-MIMO), and spatial multiplexing respective to a plurality of users may also be referred to as SDMA (Spatial Division Multiple Access) or Multi User MIMO (MU-MIMO).

The capacity of a MIMO channel increases in proportion to the number of antennas. The MIMO channel may be separated (or divided) to independent channels. When the number of transmission antennas is referred to as $N_t$, and when the number of reception antennas is referred to as $N_r$, the number of independent channels $N_i$ becomes $N_i=\min \{N_t, N_r\}$. Each of the independent channels may be referred to as a spatial layer. As a non-zero eigenvalue of a MIMO channel matrix, a rank may be defined by a number of spatial streams that can be multiplexed.

As shown in the example of a single user MIMO shown in FIG. 1, the single user MIMO corresponds to a structure wherein multiple data streams, each being different from one another, transmitted from the base station are all transmitted to a single user. In case of the single user MIMO, a MIMO channel consists of one transmitter and one receiver. In case of the single user MIMO, one user may receive all of the transmitted signals. Therefore, in case of the single user MIMO, only the data respective to a single user are scheduled to the same time/frequency domain(s). Conversely, as shown in the example of a multiple-user MIMO shown in FIG. 2, the multiple-user MIMO respectively transmits the multiple data streams, each being different from one another and being transmitted from the base station, to the plurality of users. In case of the multiple-user MIMO, one transmitter and multiple receivers collectively configure the MIMO channel. Therefore, in case of the multiple-user MIMO, the data respective to the plurality of users may be collectively scheduled to the same time/frequency domain(s).

User equipment (UE) operation modes are classified into an SU-MIMO mode and an MU-MIMO mode in terms of spatial multiplexing. The UE may be comprised of the SU-MIMO mode or the MU-MIMO mode through signaling from a base station (BS). In this case, the UE is designed to semi-statically switch a transmission mode between the SU-MIMO mode and the MU-MIMO mode. In order to perform transmission mode switching between the SU-MIMO mode and the MU-MIMO mode, the UE requires a long switching time, resulting in deterioration of overall system throughput.

DETAILED DESCRIPTION OF THE INVENTION

Technical Problem

Accordingly, the present invention is directed to a downlink data transmission method and a base station (BS), and a downlink reception method and a user equipment (UE), that substantially obviate one or more problems due to limitations and disadvantages of the related art. An object of the present invention is to provide a method and apparatus for receiving not only data transmitted by SU-MIMO transmission but also another data transmitted by MU-MIMO transmission, irrespective of UE mode switching.

Another object of the present invention is to provide a method and apparatus for transmitting, by a user equipment (UE), necessary information so as to efficiently demodulate user data transmitted to the user equipment (UE).

Another object of the present invention is to provide a method and apparatus for transmitting necessary information for user data modulation while simultaneously minimizing signaling overhead.

Another object of the present invention is to provide a method and apparatus for demodulating SU-MIMO transmission data and MU-MIMO transmission data on the basis of necessary information for user data demodulation.

It is to be understood that technical objects to be achieved by the present invention are not limited to the aforementioned technical objects and other technical objects which are not mentioned will be apparent from the following description to the person with an ordinary skill in the art to which the present invention pertains.

Technical Solution

The object of the present invention can be achieved by providing a method for transmitting downlink data to a user equipment (UE) by a base station (BS) in a wireless communication system, the method including: transmitting at least one demodulation reference signal (DMRS) for demodulating the downlink data to the user equipment (UE) on the basis of a predetermined mapping type from among a plurality of mapping types, wherein each mapping type defines a code division multiplexing (CDM) group for DMRS transmission and an orthogonal cover code (OCC) for DMRS spreading according to individual antenna ports; and transmitting type information indicating the predetermined mapping type and rank information indicating the number of transmission layers of the downlink data.

In another aspect of the present invention, a method for receiving downlink data from a base station (BS) by a user equipment (UE) in a wireless communication system includes receiving information indicating a predetermined mapping type from among a plurality of mapping types and rank information indicating the number of transmission layers of the downlink data, wherein each mapping type defines a code division multiplexing (CDM) group for DMRS transmission and an orthogonal cover code (OCC) for DMRS spreading according to individual antenna ports; detecting at least one demodulation reference signal (DMRS) transmitted for demodulating the downlink data on the basis of the predetermined mapping type and the rank information; and receiving each transmission layer of the downlink data using the at least one DMRS.

In another aspect of the present invention, a base station (BS) for transmitting downlink data to a user equipment (UE) in a wireless communication system includes a transmitter configured to transmit the downlink data to the user equipment (UE); and a processor for controlling the transmitter to transmit at least one demodulation reference signal (DMRS) demodulating the downlink data to the user equipment (UE) on the basis of a predetermined mapping type from among a plurality of mapping types, wherein each mapping type defines a code division multiplexing (CDM) group for DMRS transmission and an orthogonal cover code (OCC) for DMRS spreading according to individual antenna ports, as well as to transmit type information indicating the predetermined mapping type and rank information indicating the number of transmission layers of the downlink data.

In another aspect of the present invention, a user equipment (UE) for receiving downlink data from a base station (BS) in a wireless communication system includes a receiver; and a processor configured to control the receiver, wherein the receiver receives information indicating a predetermined mapping type from among a plurality of mapping types and rank information indicating the number of transmission layers of the downlink data, and transmits the received information to the processor, wherein each mapping type defines a code division multiplexing (CDM) group for DMRS transmission and an orthogonal cover code (OCC) for DMRS spreading according to individual antenna ports, wherein the processor controls the receiver to detect at least one demodulation reference signal (DMRS) transmitted for demodulating the downlink data on the basis of the predetermined mapping type and the rank information, and controls the receiver to receive each transmission layer of the downlink data using the at least one DMRS.

The base station (BS) transmits information indicating a start DMRS from among the at least one DMRS to the user equipment (UE).

In another aspect of the present invention, a method for transmitting downlink data to a user equipment (UE) by a base station (BS) in a wireless communication system includes multiplexing at least one demodulation reference signal (DMRS) used for demodulating the downlink data to a predetermined code division multiplexing (CDM) group; and transmitting the multiplexed DMRS through the predetermined CDM group, wherein rank information for indicating the number of transmission layers of the downlink data is transmitted and CDM group indication information for indicating the predetermined CDM group is transmitted.

In another aspect of the present invention, a method for receiving downlink data from a base station (BS) by a user equipment (UE) in a wireless communication system includes receiving rank information for indicating the number of transmission layers of the downlink data and code division multiplexing (CDM) group indication information for indicating a predetermined CDM group; detecting at least one demodulation reference signal (DMRS) transmitted through the predetermined CDM group for demodulating the downlink data, using the rank information and the CDM group indication information; and receiving each transmission layer of the downlink data using the detected DMRS.

In another aspect of the present invention, a base station (BS) for transmitting downlink data to a user equipment (UE) in a wireless communication system includes a transmitter configured to transmit the downlink data to the user equipment (UE); and a processor configured to control the transmitter, wherein the processor controls the transmitter to multiplex at least one demodulation reference signal (DMRS) used for demodulating the downlink data to a predetermined code division multiplexing (CDM) group, and controls the transmitter to transmit the multiplexed DMRS through the predetermined CDM group, and controls the transmitter to transmit rank information for indicating the number of transmission layers of the downlink data and CDM group indication information for indicating the predetermined CDM group.

In another aspect of the present invention, a user equipment (UE) for receiving downlink data from a base station (BS) in a wireless communication system includes a receiver; and a processor configured to control the receiver which receives rank information for indicating the number of transmission layers of the downlink data and code division multiplexing (CDM) group indication information for indicating a predetermined CDM group, and transfers the received information to the processor, wherein the processor controls the receiver to detect at least one demodulation reference signal (DMRS) transmitted through the predetermined CDM group for demodulating the downlink data using the rank information and the CDM group indication information, and also controls the receiver to receive each transmission layer of the downlink data using the detected DMRS.

The at least one DMRS is spread per DMRS by at least one orthogonal cover code (OCC), the spread DMRS is multiplexed to the predetermined CDM group, and the base station (BS) can transmit start OCC indication information indicating a start OCC from among the at least one OCC to the user equipment (UE).

In another aspect of the present invention, a method for transmitting a single transport block (TB) acting as at least one transmission layer to a user equipment (UE) by a base station (BS) capable of transmitting a plurality of transport blocks (TBs) in a wireless communication system includes transmitting the at least one transmission layer to the user equipment (UE) either through at least one antenna port contained in a first antenna port group or through at least one antenna port contained in a second antenna port group; if the at least one transmission layer is transmitted through the first antenna port group, transmitting downlink control information in which a new data indicator (NDI) of each transport block (TB) other than the single transport block (TB) is set to a first value so as to indicate the first antenna port group, to the user equipment (UE); and if the at least one transmission layer is transmitted through the second antenna port group, transmitting downlink control information in which a new data indicator (NDI) of each transport block (TB) other than the single transport block (TB) is set to a second value so as to indicate the second antenna port group, to the user equipment (UE).

In another aspect of the present invention, a method for receiving a single transport block (TB) acting as at least one transmission layer from a base station (BS) by a user equipment (UE) capable of transmitting a plurality of transport blocks (TBs) in a wireless communication system includes receiving downlink control information from the base station (BS); and receiving the at least one transmission layer transmitted either through a first antenna port group or through a first antenna port group on the basis of a new data indicator (NDI) for each TB contained in the downlink control information, wherein the downlink control information includes control information in which, if the at least one transmission layer is transmitted through the first antenna port group, a new data indicator (NDI) of each transport block (TB) other than the single transport block (TB) is set to a first value so as to indicate the first antenna port group; and wherein the downlink control information includes control information in which, if the at least one transmission layer is transmitted through the second antenna port group, a new data indicator (NDI) of each transport block (TB) other than the single transport block (TB) is set to a second value so as to indicate the second antenna port group.

In another aspect of the present invention, a base station (BS) for transmitting a single transport block (TB) acting as at least one transmission layer to a user equipment (UE) so as to transmit a plurality of transport blocks (TBs) in a wireless communication system includes a transmitter configured to transmit the downlink data to the user equipment (UE); and a processor configured to control the transmitter, wherein the processor controls the transmitter to transmit the at least one transmission layer to the user equipment (UE) either through at least one antenna port contained in a first antenna port group or through at least one antenna port contained in a second antenna port group; the processor controls the transmitter such that, if the at least one transmission layer is transmitted through the first antenna port group, the transmitter transmits downlink control information in which a new data indicator (NDI) of each transport block (TB) other than the single transport block (TB) is set to a first value so as to indicate the first antenna port group, to the user equipment (UE); and the processor controls the transmitter such that, if the at least one transmission layer is transmitted through the second antenna port group, the transmitter transmits downlink control information in which a new data indicator (NDI) of each transport block (TB) other than the single transport block (TB) is set to a second value so as to indicate the second antenna port group, to the user equipment (UE).

In another aspect of the present invention, a user equipment (UE) for receiving a single transport block (TB) acting as at least one transmission layer from a base station (BS) so as to transmit a plurality of transport blocks (TBs) in a wireless communication system includes a receiver; and a processor configured to control the receiver, wherein the receiver receives downlink control information from the base station (BS) and transmits the received information to the processor, the processor controls the receiver to receive the at least one transmission layer transmitted either through a first antenna port group or through a first antenna port group on the basis of a new data indicator (NDI) for each TB contained in the downlink control information. The downlink control information includes control information in which, if the at least one transmission layer is transmitted through the first antenna port group, a new data indicator (NDI) of each transport block (TB) other than the single transport block (TB) is set to a first value so as to indicate the first antenna port group; and includes another control information in which, if the at least one transmission layer is transmitted through the second antenna port group, a new data indicator (NDI) of each transport block (TB) other than the single transport block (TB) is set to a second value so as to indicate the second antenna port group.

The aforementioned technical solutions are only a part of the embodiments of the present invention, and various modifications to which technical features of the present invention are applied could be understood by the person with ordinary skill in the art to which the present invention pertains, based on the following detailed description of the present invention.

Effects of the Invention

As is apparent from the above description, exemplary embodiments of the present invention have the following effects.

In accordance with the embodiments of the present invention, although a MIMO transmission mode is not changed, a user equipment (UE) can receive SU-MIMO transmission data and MU-MIMO transmission data. As a result, a time required for switching a transmission/reception (Tx/Rx) mode of the user equipment (UE) is reduced, resulting in an increase in overall system throughput.

In accordance with the present invention, the user equipment (UE) can efficiently demodulate user data transmitted to the user equipment (UE).

The base station (BS) according to the present invention can transmit necessary information for user data modulation while simultaneously minimizing signaling overhead.

The user equipment (UE) according to the present invention can demodulate SU-MIMO transmission data and MU-MIMO transmission data on the basis of necessary information for user data demodulation.

It will be appreciated by persons skilled in the art that the effects that could be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention, illustrate embodiments of the invention and together with the description serve to explain the principle of the invention.

FIG. 11 is a diagram illustrating DMRS patterns of antenna ports #7~#10;

BEST MODE FOR CARRYING OUT THE INVENTION

Figure 1:
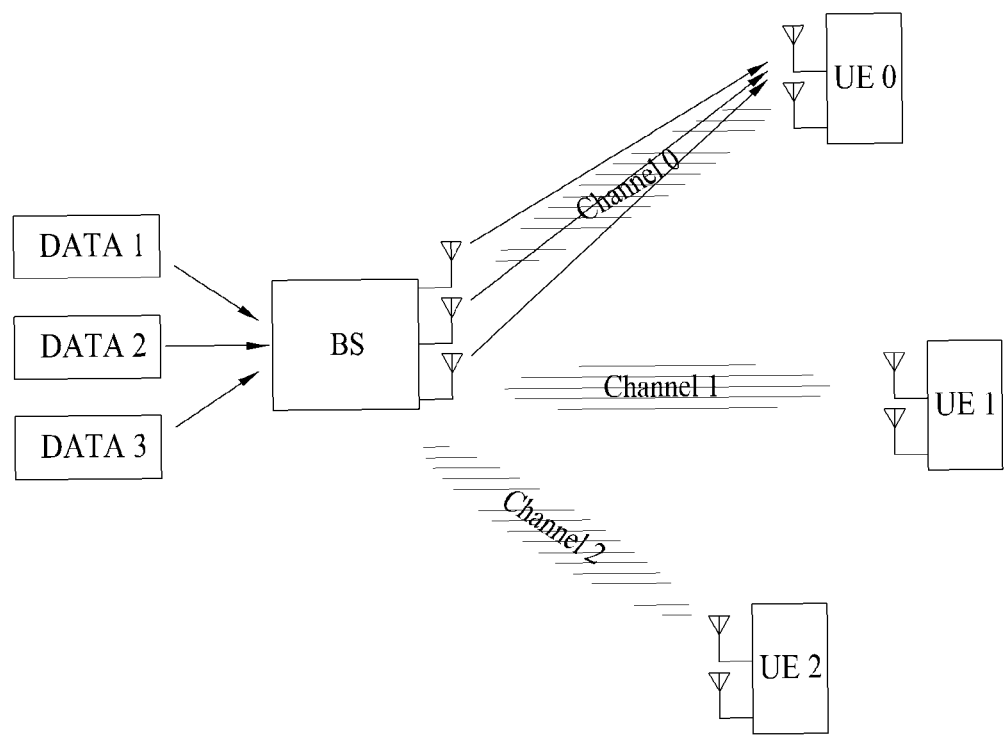
FIG. 1 is a conceptual diagram illustrating an example of SU-MIMO.
Figure 2:
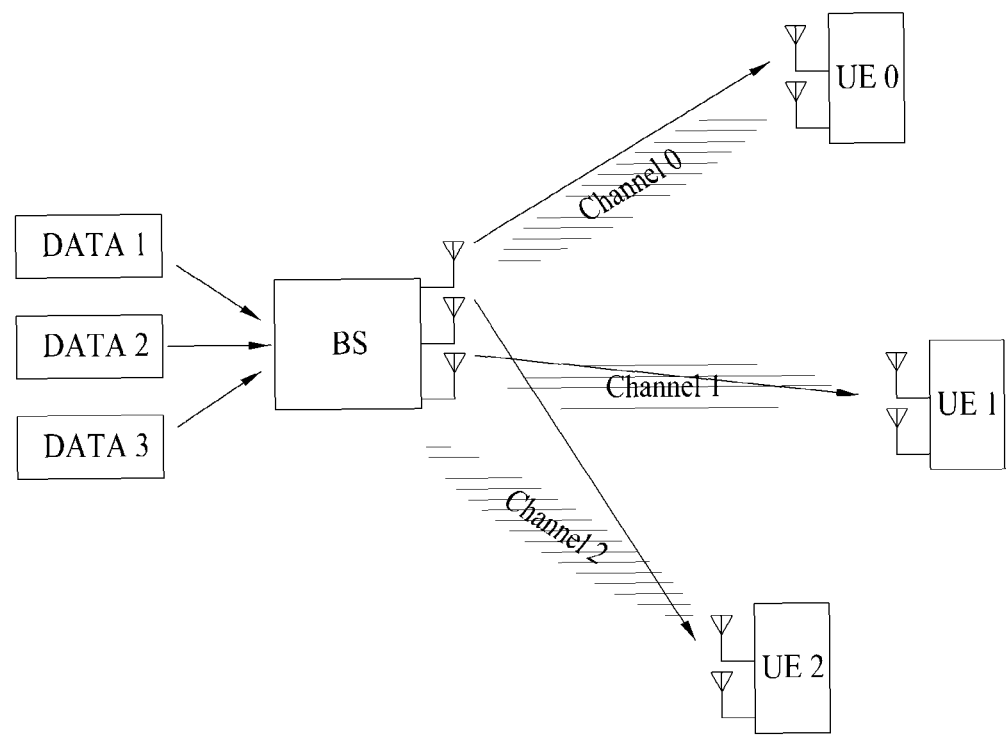
FIG. 2 is a conceptual diagram illustrating an example of multi-user MIMO.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters.

Techniques, apparatus and systems described herein can be used in various wireless access technologies such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. The CDMA may be implemented with a radio technology such as Universal Terrestrial Radio Access (UTRA) or CDMA2000. The TDMA may be implemented with a radio technology such as Global System for Mobile communications (GSM)/General Packet Radio Service (GPRS)/Enhanced Data Rates for GSM Evolution (EDGE). The OFDMA may be implemented with a radio technology such as institute of electrical and electronics engineers (IEEE) 802.11 (Wi-Fi), IEEE 802.16 (WiMAX), IEEE 802-20, Evolved-UTRA (E-UTRA) etc. The UTRA is a part of a Universal Mobile Telecommunication System (UMTS). 3rd Generation Partnership Project (3GPP) Long Term Evolution (LTE) is a part of an Evolved-UMTS (E-UMTS) using the E-UTRA. The 3GPP LTE employs the OFDMA in downlink (DL) and employs the SC-FDMA in uplink (UL). LTE-Advance (LTE-A) is an evolution of the 3GPP LTE. For clarity, this application focuses on the 3GPP LTE/LTE-A. However, technical features of the present invention are not limited thereto. For example, although the following description will be made based on a mobile communication system corresponding to a 3GPP LTE/LTE-A system, the following description can be applied to other mobile communication systems except unique features of the 3GPP LTE/LTE-A system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a User Equipment (UE) denotes a mobile or fixed type user terminal. Examples of the UE include various equipments that transmit and receive user data and/or various kinds of control information to and from a base station. The UE may be referred to as, a Terminal Equipment (TE), a Mobile Station (MS), a Mobile Terminal (MT), a User Terminal (UT), a Subscriber Station (SS), a wireless device, a Personal Digital Assistant (PDA), a wireless modem, or a handheld device. Also, in the present invention, a Base Station (BS) means a fixed station that performs communication with a user equipment and/or another base station, and exchanges various kinds of data and control information with the user equipment and another base station. The base station may be referred to another terminology such as an Evolved-NodeB (eNB), a Base Transceiver System (BTS), and an Access Point (AP).

In the present invention, PDCCH (Physical Downlink Control CHannel)/PCFICH (Physical Control Format Indicator CHannel)/PHICH (Physical Hybrid-ARQ Indicator CHannel)/PDSCH (Physical Downlink Shared CHannel)/DRS (Dedicate Reference Signal)/CRS (Common Reference Signal)/DMRS (DeModulation Reference Signal)/CSI-RS (Channel State Information Reference Signal) resource element (RE) represents an RE assigned to or available for PDCCH/PCFICH/PHICH/PDSCH/DRS/CRS/DMRS/CSI-RS. In particular, a resource element (RE) carrying a reference signal shall be named RS RE and a resource element (RE) carrying control information or data shall be named data RE.

Hereinafter, symbol/carrier/subcarrier to which DRS/CRS/DMRS/CSI-RS is assigned is referred to as DRS/CRS/DMRS/CSI-RS symbol/carrier/subcarrier. For example, a symbol to which DRS is assigned is referred to as a DRS symbol, and a subcarrier to which DRS is assigned is referred to as a DRS subcarrier. Besides, a symbol to which user data (for example, PDSCH data, PDCCH data, and etc.) is assigned is referred to as data symbol, and a subcarrier to which user data is assigned is referred to as data subcarrier.

Meanwhile, in the present invention, if a specific signal is allocated to frame/subframe/slot/symbol/carrier/subcarrier, it means that the specific signal is transmitted through the corresponding carrier/subcarrier during a period/timing of the corresponding frame/subframe/slot/symbol.

Hereinafter, if the special signal is allocated to superframe/frame/subframe/symbol/carrier/subcarrier, it means that the special signal is transmitted through the corresponding carrier/subcarrier during a period/timing of the corresponding superframe/frame/subframe/symbol.

Figure 3:
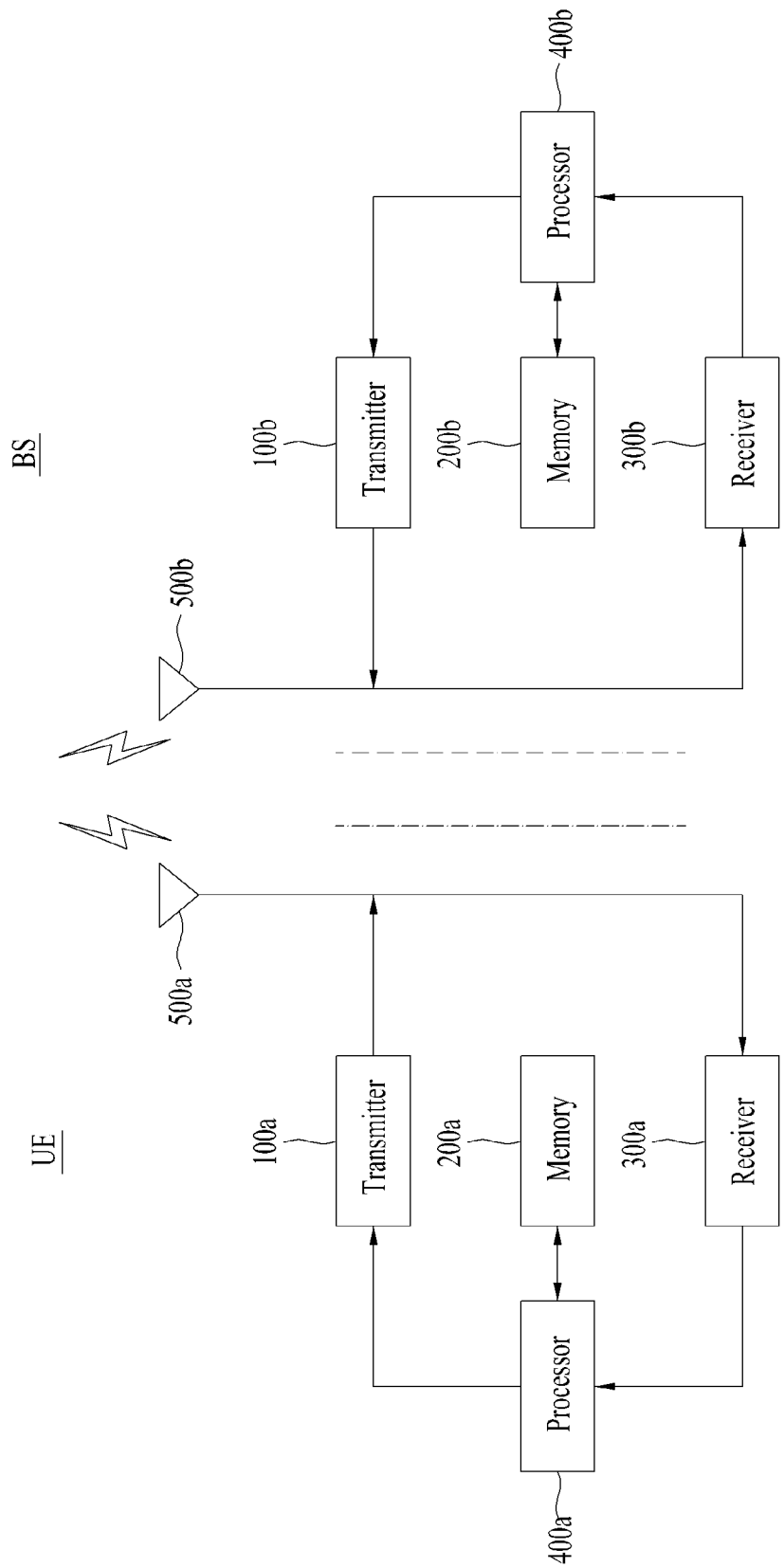
FIG. 3 is a block diagram illustrating constituent elements of a user equipment (UE) and a base station (BS) according to the present invention.

FIG. 3 illustrates a block view showing elements configuring a user equipment and base station performing the method according to the present invention.

The user equipment operates as a transmitting device in an uplink and operates as a receiving device in a downlink. The base station operates as a receiving device in an uplink and operates as a transmitting device in a downlink.

Each of the user equipment and the base station includes antenna(s) (500a, 500b) that can receive information and/or data, signals, messages, and so on, a Transmitter (100a, 100b) transmitting messages by controlling the antenna(s), a Receiver (300a, 300b) receiving messages by controlling the antenna(s), and a memory (200a, 200b) storing various information related to communication within the wireless communication system. Also, each of the user equipment and the base station includes a processor (400a, 400b), which is configured to perform the present invention by controlling the elements included in the user equipment and the base station, such as the transmitter and the receiver, and the memory, and so on. The transmitter (100a), the receiver (300a), the memory (200a), and the processor (400a) included in the user equipment may each be implemented as independent elements by using separate chips, or a combination of at least two or more elements may be implemented by using a single chip. Similarly, the transmitter (100b), the receiver (300b), the memory (200b), and the processor (400b) included in the base station may each be implemented as independent elements by using separate chips, or a combination of at least two or more elements may be implemented by using a single chip. The transmitter and receiver may also be combined so as to be implemented as a single transceiver within the user equipment or the base station.

The antenna (500a, 500b) performs the function of transmitting a signal, which is generated from the transmitter (100a, 100b), to an outside target, or the antenna(s) (500a, 500b) performs the functions of receiving a radio signal from an outside source and delivering the received radio signal to the receiver (300a, 300b). In case of a transceiving module supporting the Multi-Input Multi-Output (MIMO) function, which transmits and receives data by using multiple antennas, the transceiving module may be connected to 2 or more antennas.

The processor (400a, 400b) generally controls the overall operations of each module within the user equipment or the base station. Most particularly, the processor (400a, 400b) may perform various control functions for performing the present invention, MAC (Medium Access Control) frame variable control functions respective to service characteristics and frequency environments, power saving mode functions for controlling idle mode operations, Hand Over functions, certification and encryption functions, and so on. The processor (400a, 400b) may also be referred to as a controller, a microcontroller, a microprocessor, a microcomputer, and so on. Meanwhile, the processor (400a, 400b) may be implemented in the form of hardware or firmware, or software, or in a combination of at least two or more of hardware, firmware, and software. In case of implementing the embodiments of the present invention by using hardware, ASICs (Application Specific Integrated Circuits) or DSPs (Digital Signal Processors), DSPDs (Digital Signal Processing Devices), PLDs (Programmable Logic Devices), FPGAs (Field Programmable Gate Arrays), and so on, which are configured to perform the present invention, may be provided in the processor (400a, 400b). Meanwhile, in case of implementing the embodiments of the present invention by using firmware or software, the firmware or software may be configured to include a module, procedure, or function performing the above-described functions or operations, and the firmware or software, which is configured to perform the present invention may be provided in the processor (400a, 400b), or may be stored in the memory (200a, 200b) so as to be operated by the processor (400a, 400b).

The transmitter (100a, 100b) performs coding and modulation on signals and/or data that are to be scheduled by the processor (400a, 400b) or by a scheduler being connected to the processor, so as to be transmitted to an outside target and, then, transmits the processed signals and/or data to the antenna (500a, 500b). For example, the transmitter (100a, 100b) converts a data sequence that is to be transmitted to K number of layers by performing demultiplexing, channel encoding, and modulation processes. The K number of layers passes through a transmission processor included in the transmitter, so as to be transmitted through the transmitting antenna (500a, 500b). The transmitter (100a, 100b) and the receiver (300a, 300b) of the user equipment (12) and the base station (11) may each be differently configured depending upon the procedures for processing the transmission signal and the reception signal.

Figure 4:
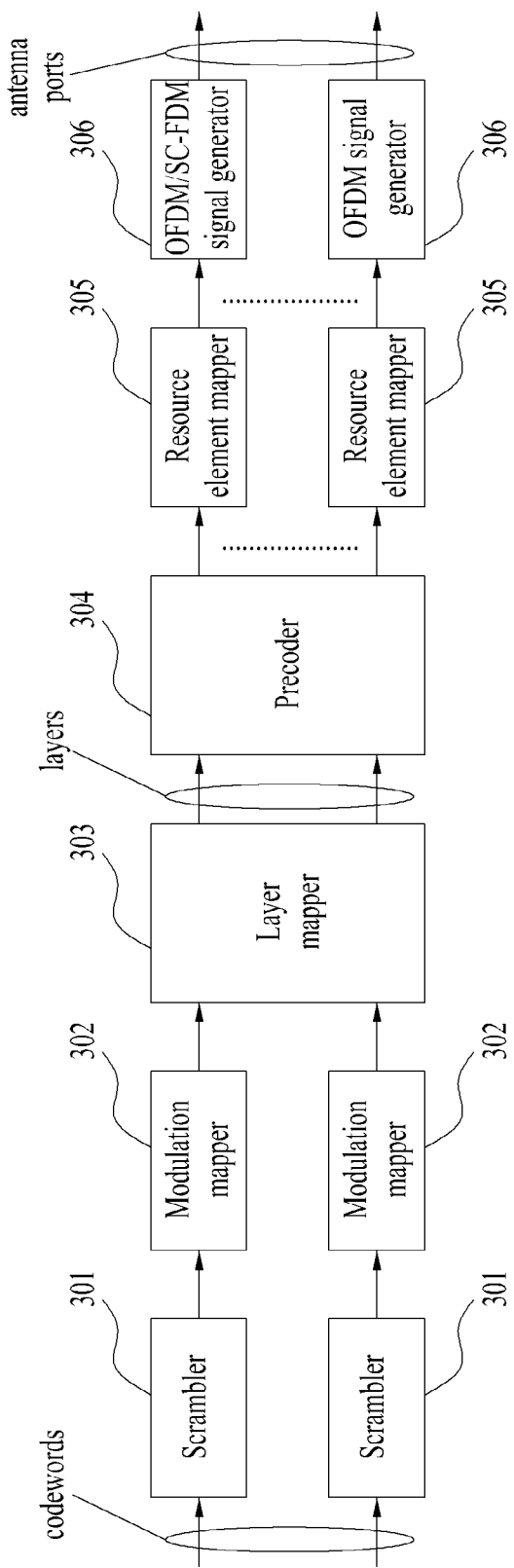
FIG. 4 is a conceptual diagram illustrating a process for processing signals of a transmitter for use in a UE and a BS.

FIG. 4 is a block diagram of an exemplary transmitter in each of the UE and the BS. Operations of the transmitters 100a and 100b will be described below in more detail with reference to FIG. 4.

Referring to FIG. 4, each of the transmitters 100a and 100b include scramblers 301, modulation mappers 302, a layer mapper 303, a precoder 304, RE mappers 305, Orthogonal Frequency Division Multiplexing/Single Carrier Frequency Division Multiplexing (OFDM/SC-FDM) signal generators 306.

The transmitters 100a and 100b may transmit more than one codeword. The scramblers 301 scramble the coded bits of each codeword, for transmission on a physical channel. A codeword may be referred to as a data stream and is equivalent to a data block from the MAC layer. The data block from the MAC layer is referred to as a transport block.

The modulation mappers 302 modulate the scrambled bits, thus producing complex modulation symbols. The modulation mappers 302 modulate the scrambled bits to complex modulation symbols representing positions on a signal constellation in a predetermined modulation scheme. The modulation scheme may be, but not limited to, any of m-Phase Shift Keying (m-PSK) and m-Quadrature Amplitude Modulation (m-QAM).

The layer mapper 303 maps the complex modulation symbols to one or several transmission layers.

The precoder 304 may precode the complex modulation symbols on each layer, for transmission through the antenna ports. More specifically, the precoder 304 generates antenna-specific symbols by processing the complex modulation symbols for multiple transmission antennas 500-1 to 500-$N_t$ in a MIMO scheme, and distributes the antenna-specific symbols to the RE mappers 305. That is, the precoder 304 maps the transmission layers to the antenna ports. The precoder 304 may multiply an output x of the layer mapper 303 by an $N_t \times M_t$ precoding matrix W and output the resulting product in the form of an $N_t \times M_F$ matrix z.

The RE mappers 305 map/allocate the complex modulation symbols for the respective antenna ports to REs. The RE mappers 305 may allocate the complex modulation symbols for the respective antenna ports to appropriate subcarriers, and may multiplex them according to users.

The OFDM/SC-FDM signal generators 306 modulate the complex modulation symbols for the respective antenna ports, that is, the antenna-specific symbols through OFDM or SC-FDM modulation, thereby producing a complex time-domain OFDM or SC-FDM symbol signal. The OFDM/SC-FDM signal generators 306 may perform Inverse Fast Fourier Transform (IFFT) on the antenna-specific symbols and insert a Cyclic Prefix (CP) into the resulting IFFT time-domain symbol. The OFDM symbol is transmitted through the transmission antennas 500-1 to 500-N$_t$ to a receiver after digital-to-analog conversion, frequency upconversion, etc. The OFDM/SC-FDM signal generators 306 may include an IFFT module, a CP inserter, a Digital-to-Analog Converter (DAC), a frequency upconverter, etc.

If the transmitters 100a and 100b adopt SC-FDMA for transmitting a codeword, the transmitters 100a and 100b include an FFT processor (not shown). The FFT processor performs FFT on the complex modulation symbols for each antenna and outputs the FFT symbol to the RE mappers 305.

The receivers 300a and 300b operate in the reverse order to the operation of the transmitters 100a and 100b. The receivers 300a and 300b decode and demodulate radio signals received through the antennas 500a and 500b from the outside and transfer the demodulated signals to the processors 400a and 400b. The antenna 500a or 500b connected to each of the receivers 300a and 300b may include N$_r$ reception antennas. A signal received through each reception antenna is down-converted to a baseband signal and then recovered to the original data stream transmitted by the transmitter 100a or 100b through multiplexing and MIMO demodulation. Each of the receivers 300a and 300b may include a signal recoverer for downconverting a received signal to a baseband signal, a multiplexer for multiplexing received signals, and a channel demodulator for demodulating the multiplexed signal stream to a codeword. The signal recoverer, the multiplexer, and the channel demodulator may be configured into an integrated module for performing their functions or independent modules. To be more specific, the signal recoverer may include an Analog-to-Digital Converter (ADC) for converting an analog signal to a digital signal, a CP remover for removing a CP from the digital signal, an FFT module for generating a frequency-domain symbol by performing FFT on the CP-removed signal, and an RE demapper/equalizer for recovering antenna-specific symbols from the frequency-domain symbol. The multiplexer recovers transmission layers from the antenna-specific symbols and the channel demodulator recovers the codeword transmitted by the transmitter from the transmission layers.

If the receivers 300a and 300b receive signals transmitted by SC-FDMA, each of the receivers 300a and 300b further includes an IFFT module. The IFFT module IFFT-processes the antenna-specific symbols recovered by the RE demapper and outputs the IFFT symbol to the multiplexer.

While it has been described in FIGS. 3 and 4 that each of the transmitters 100a and 100b includes the scramblers 301, the modulation mappers 302, the layer mapper 303, the precoder 304, the RE mappers 305, and the OFDM/SC-FDM signal generators 306, it may be further contemplated that the scramblers 301, the modulation mappers 302, the layer mapper 303, the precoder 304, the RE mappers 305, and the OFDM/SC-FDM signal generators 306 are incorporated into each of the processors 400a and 400b of the transmitters 100a and 100b. Likewise, while it has been described in FIGS. 3 and 4 that each of the receivers 300a and 300b includes the signal recoverer, the multiplexer, and the channel demodulator, it may be further contemplated that the signal recoverer, the multiplexer, and the channel demodulator are incorporated into each of the processors 400a and 400b of the receivers 300a and 300b. For the convenience's sake of description, the following description will be given with the appreciation that the scramblers 301, the modulation mappers 302, the layer mapper 303, the precoder 304, the RE mappers 305, and the OFDM/SC-FDM signal generators 306 are included in the transmitters 100a and 100b configured separately from the processors 400a and 400b that controls their operations, and the signal recoverer, the multiplexer, and the channel demodulator are included in the receivers 300a and 300b configured separately from the processors 400a and 400b that controls their operations. However, it is to be noted that even though the scramblers 301, the modulation mappers 302, the layer mapper 303, the precoder 304, the RE mappers 305, and the OFDM/SC-FDM signal generators 306 are included in the processors 400a and 400b or the signal recoverer, the multiplexer, and the channel demodulator are included in the processors 400a and 400b, embodiments of the present invention are applicable in the same manner.

The memories 200a and 200b may store programs required for signal processing and controlling of the processors 400a and 400b and temporarily store input and output information. The memories 200a and 200b may store codebooks according to the exemplary embodiment of the present invention to be described later. The memories 200a and 200b may store predefined codebooks with respect to each rank. Each of the memories 200a and 200b may be implemented into a flash memory-type storage medium, a hard disc-type storage medium, a multimedia card micro-type storage medium, a card-type memory (e.g. a Secure Digital (SD) or eXtreme Digital (XS) memory), a Random Access Memory (RAM), a Read-Only Memory (ROM), an Electrically Erasable Programmable Read-Only Memory (EEPROM), a Programmable Read-Only Memory (PROM), a magnetic memory, a magnetic disc, or an optical disk.

Figure 5:
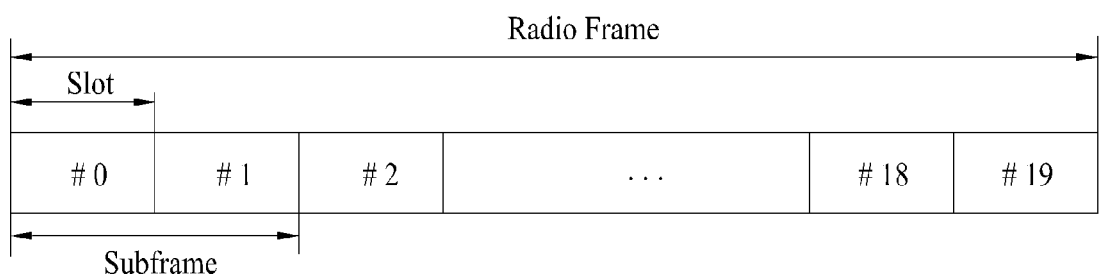
FIG. 5 is a diagram illustrating a radio frame structure for use in a wireless communication system.

FIG. 5 illustrates an exemplary structure of a radio frame in a wireless communication system. Specifically, the radio frame is a 3GPP LTE/LTE-A radio frame. The radio frame structure is applicable to a Frequency Division Duplex (FDD) mode, a half FDD (H-FDD) mode, and a Time Division Duplex (TDD) mode.

Referring to FIG. 5, a 3GPP LTE/LTE-A radio frame is 10 ms (307,200T$_s$) in duration. The radio subframe is divided into 10 equally-sized subframes, each subframe being 1 ms long. T$_s$ represents a sampling time and is given as T$_s$=1/(2048×15 kHz). Each subframe is further divided into two slots, each of 0.5 ms in duration. 20 slots are sequentially numbered from 0 to 19. A time interval in which one subframe is transmitted is defined as a Transmission Time Interval (TTI).

Figure 6:
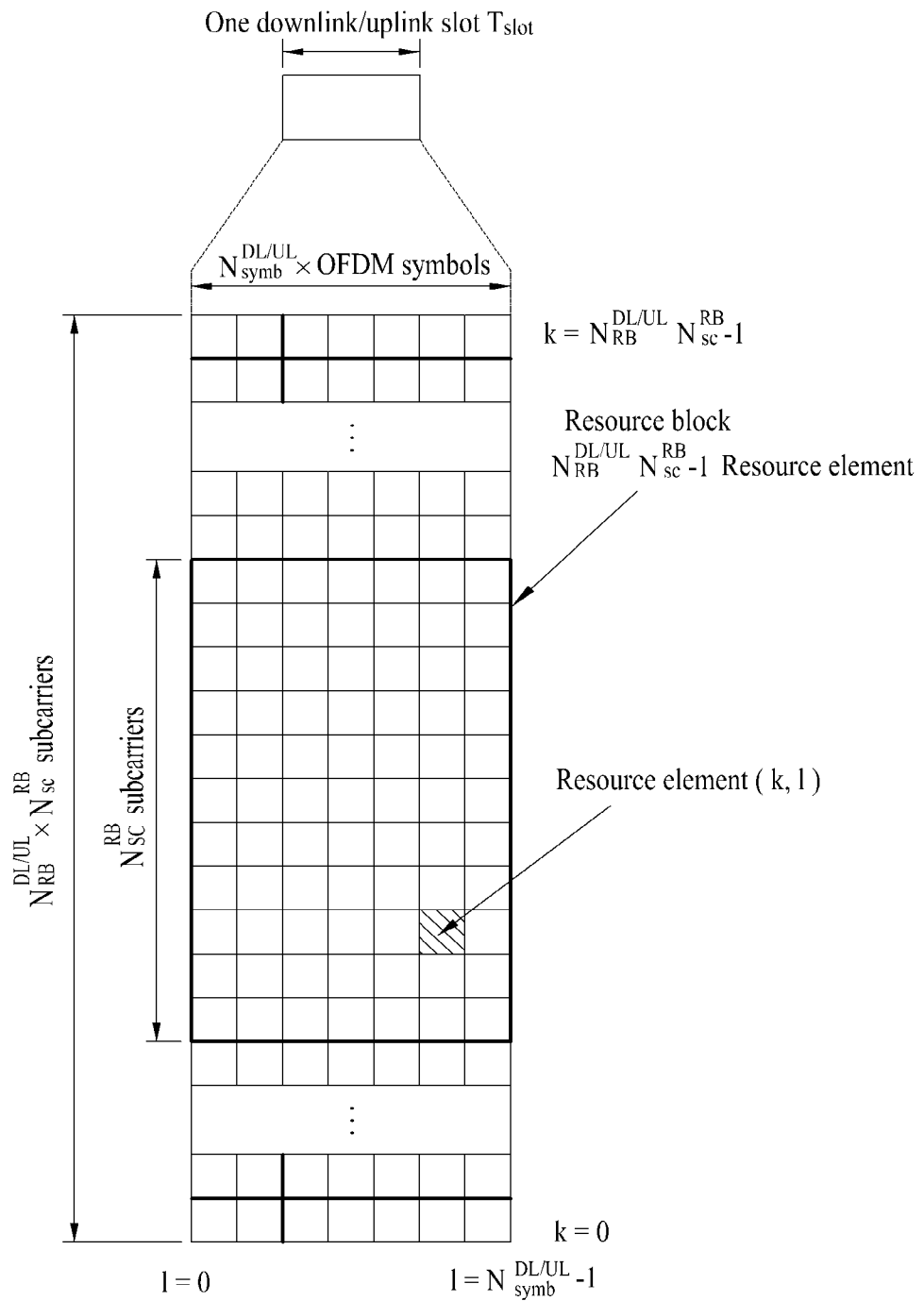
FIG. 6 is an exemplary structural diagram illustrating DL/UL slot structures for use in a wireless communication system.

FIG. 6 illustrates an exemplary structure of a DownLink/UpLink (DL/UL) slot in the wireless communication system. Specifically, FIG. 6 illustrates the structure of a resource grid in the 3GPP LTE/LTE-A system.

Referring to FIG. 6, a slot includes a plurality of OFDM symbols in the time domain by a plurality of Resource Blocks (RBs) in the frequency domain. An OFDM symbol may refer to one symbol duration. An RB includes a plurality of sub-carriers in the frequency domain. An OFDM symbol may be called an OFDM symbol, an SC-FDM symbol, etc. according to a multiple access scheme. The number of OFDM symbols per slot may vary depending on a channel bandwidth and a CP length. For instance, one slot includes 7 OFDM symbols in case of a normal CP, whereas one slot includes 6 OFDM symbols in case of an extended CP. While a subframe is shown in FIG. 6 as having a slot with 7 OFDM symbols for illustrative purposes, embodiments of the present invention are also applicable to subframes with any other number of OFDM symbols. A resource including one OFDM symbol by one subcarrier is referred to as a Reference Element (RE) or a tone.

Referring to FIG. 6, a signal transmitted in each slot may be described by a resource grid including $N^{DL/UL}_{RB}N^{RB}_{sc}$ subcarriers and $N^{DL/UL}_{symb}$ OFDM or SC-FDM symbols. $N^{DL}_{RB}$ represents the number of RBs in a DL slot and $N^{DL}_{RB}$ represents the number of RBs in a UL slot. $N^{DL}_{symb}$ represents the number of OFDM or SC-FDMA symbols in the DL slot and $N^{UL}_{symb}$ represents the number of OFDM or SC-FDMA symbols in the UL slot. $N^{RB}_{sc}$ represents the number of subcarriers in one RB.

In other words, a Physical Resource Block (PRB) is defined as $N^{DL/UL}_{symb}$ consecutive OFDM symbols or SC-FDMA symbols in the time domain by $N^{RB}_{sc}$ consecutive subcarriers in the frequency domain. Therefore, one PRB includes $N^{DL/UL}_{symb} \times N^{RB}_{sc}$ REs.

Each RE in the resource grid may be uniquely identified by an index pair (k, l) in a slot. k is a frequency-domain index ranging from 0 to $N^{DL/UL}_{RB} \times N^{RB}_{sc}-1$ and l is a time-domain index ranging from 0 to $N^{DL/UL}_{symb}-1$.

Figure 7:
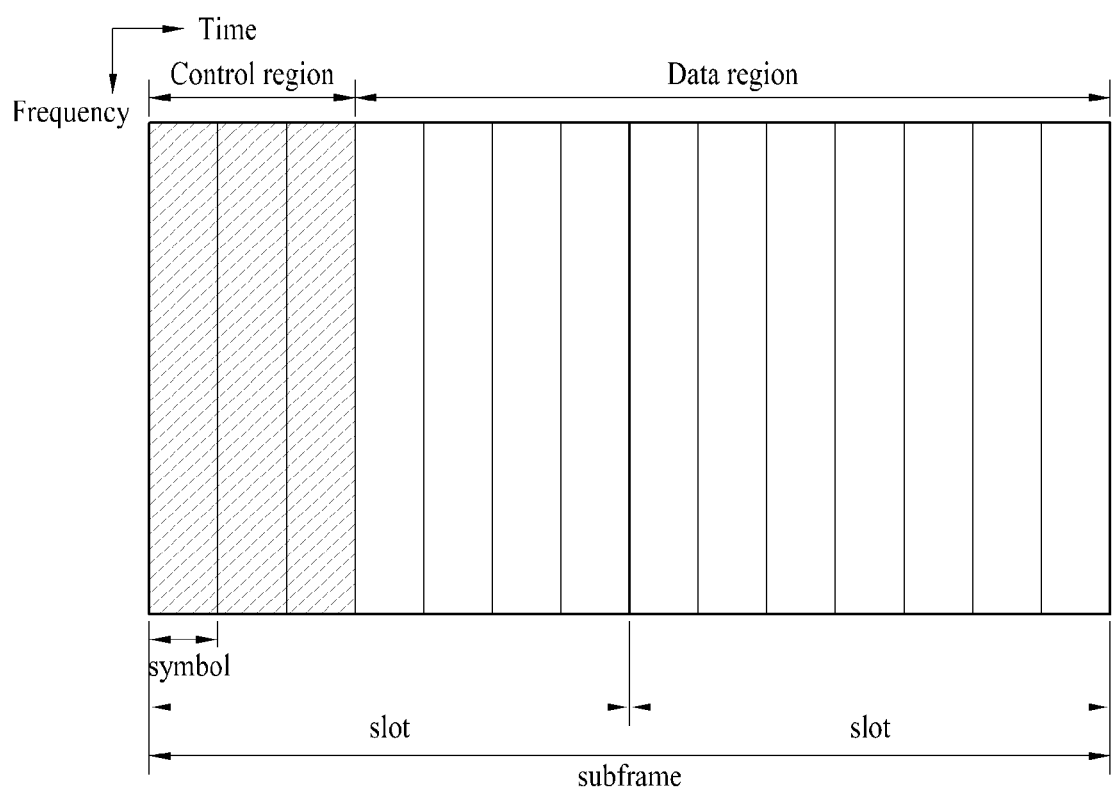
FIG. 7 is a diagram illustrating an example of an downlink subframe structure for use in a wireless communication system.

FIG. 7 illustrates an exemplary structure of a downlink subframe in a wireless communication system.

Referring to FIG. 7, each subframe may be divided into a control region and a data region. The control region starts from the first OFDM symbol and includes at least one or more OFDM symbols. The number of OFDM symbols that are being used as the control region within the subframe is transmitted through the PCFICH (Physical Control Format Indicator CHannel). The base station may transmit diverse types of control information to the user equipment(s) through the control region. In order to transmit the control information, a PDCCH (Physical Downlink Control CHannel), PCFICH, PHICH (Physical Hybrid automatic retransmit request Indicator CHannel), and so on may be assigned to the control region.

The base station may transmit data designated for the user equipment or user equipment group through the data region. Herein, the data being transmitted through the data region may also be referred to as user data. In order to transmit the user data, a PDSCH (Physical Downlink Shared CHannel) may be allocated to the data region. The user equipment may decode the control information being transmitted through the PDCCH, so as to be capable of reading the data being transmitted through the PDSCH. For example, information indicating which user equipment or user equipment group the data of the PDSCH is being transmitted to, information indicating how the user equipment or user equipment group is to receive and decode the PDSCH data, and so on may be included in the PDCCH and then transmitted.

The PDCCH carries a transport format of a DL-SCH (Downlink Shared Channel) and a resource allocation (or assignment) information, resource allocation information of a UL-SCH (Uplink Shared Channel), paging information on a PCH (paging channel), system information on the DL-SCH, allocation information of a higher layer control message, such as a random access response, which is transmitted on the PDSCH, a group of Tx power control commands for each of the UEs within a random UE group, information on a VoIP (voice over IP) activation, and so on. Multiple PDCCHs may be transmitted in the control region. The UE may monitor the multiple PDCCHs and may detect its own PDCCH. In the PDCCH, the size and purpose of the control information may vary depending upon a DCI (downlink control indicator) format, and the size may also vary depending upon the coding rate.

The DCI format may be independently applied for each UE, and the PDCCH of multiple UEs may be multiplexed in one subframe. The PDCCH of each UE may be independently channel-coded so that a CRC (cyclic redundancy check) can be added to the respective PDCCH. The CRC is masked with a unique identifier of each UE so that each UE can receive its respective PDDCH. However, since the UE is essentially unaware of the position to which its PDCCH is being transmitted, the UE is required to perform blind detection (also referred to as blind decoding) on all of the PDCCHs of the corresponding DCI format, until the UE receives the PDCCH having the identifier of the corresponding UE.

There are a variety of DCI formats, for example, format 0 for scheduling a physical uplink shared channel (PUSCH), format 1 for scheduling one PDSCH codeword, format 1A for compact scheduling of one PDSCH codeword, format 1B for compact scheduling of Rank-1 transmission of a single codeword in a spatial multiplexing mode, format 1C for very compact scheduling of a downlink shared channel (DL-SCH), format 1D for scheduling a PDSCH in a multi-user spatial multiplexing mode, format 2 for scheduling a PDSCH in a closed-loop spatial multiplexing mode, format 2A for scheduling a PDSCH in an open-loop spatial multiplexing mode, format 3 for transmitting a transmission power control (TPC) command of 2-bits power control for PUCCH and PUSCH, and format 3A for transmitting a TPC command of 1-bit power control for PUCCH and PUSCH.

Hereinafter, in the description of the present invention, the transmission of data for a UE may be expressed as a PDSCH transmission, and the transmission of control information related to the data may be expressed as a PDCCH transmission, for simplicity.

Figure 8:
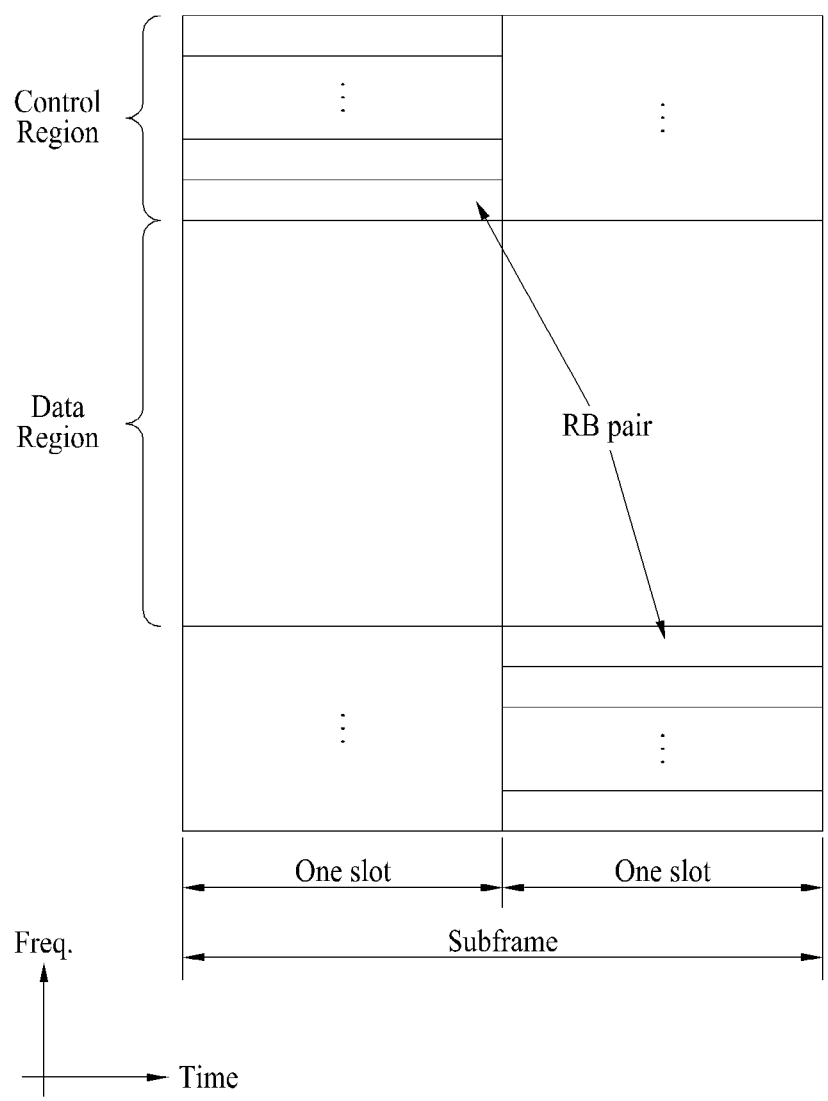
FIG. 8 is a diagram illustrating an example of an uplink subframe structure for use in a wireless communication system.

FIG. 8 illustrates an exemplary uplink subframe in a wireless communication system.

Referring to FIG. 8, an uplink subframe may be divided into a control region and a data region in the frequency domain. In order to carry UCI (uplink control information), one or more PUCCHs (physical uplink channels) may be allocated to the control region. In order to carry user data, one or more PUSCHs (physical uplink shared channels) may be allocated to the data region. When the UE adopts the SC-FDMA scheme for the uplink transmission, in order to maintain the single carrier characteristic, the PUCCH and the PUSCH cannot be transmitted simultaneously. The PUCCH for one UE may be allocated to an RB pair within the subframe, and the RBs belonging to the RB pair may each occupy a different subcarrier within two slots. Herein, it may be expressed that an RB pair allocated to the PUCCH performs frequency-hopping at a slot boundary of the PUCCH being allocated as described above.

Meanwhile, a reference signal (RS) refers to a predefined signal with a special waveform known to both the BS and the UE, transmitted from the BS to the UE or from the UE to the BS.

RSs are largely classified into dedicated reference signals (DRSs) and common reference signals (CRSs). A CRS is transmitted in every DL subframe in a cell supporting PDSCH transmission. CRSs are used for both purposes of demodulation and measurement and shared among all UEs within the cell. A CRS sequence is transmitted through every antenna port irrespective of layers. A DRS is usually used for demodulation, dedicated to a specific UE. The CRSs and DRSs are also called cell-specific RSs and DMRSs, respectively. The DMRSs are also called UE-specific RSs.

Figure 9:
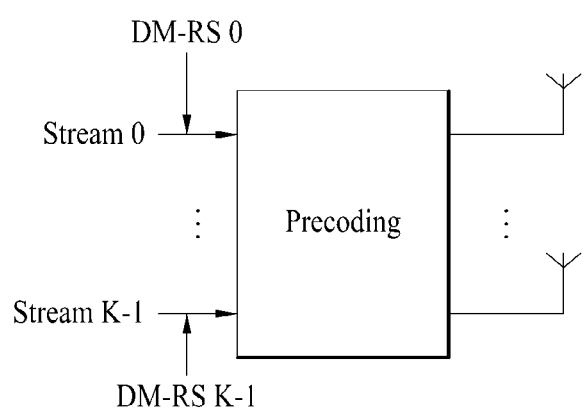
FIG. 9 is a conceptual diagram illustrating DRS transmission.

FIG. 9 is a conceptual view of DRS transmission. Particularly, a transmitter for transmitting precoded RSs is illustrated in FIG. 9, by way of example.

A DRS is dedicated to a particular UE and thus other UEs are not allowed to use the DRS. DRSs used for data demodulation at a specific UE may be classified into precoded RSs and non-precoded RSs. For example, the UE may demodulate a received data signal by arranging the data signal at predetermined positions on a signal constellation according to a predetermined modulation scheme, based on DRSs received along with the data signal.

Figure 10:
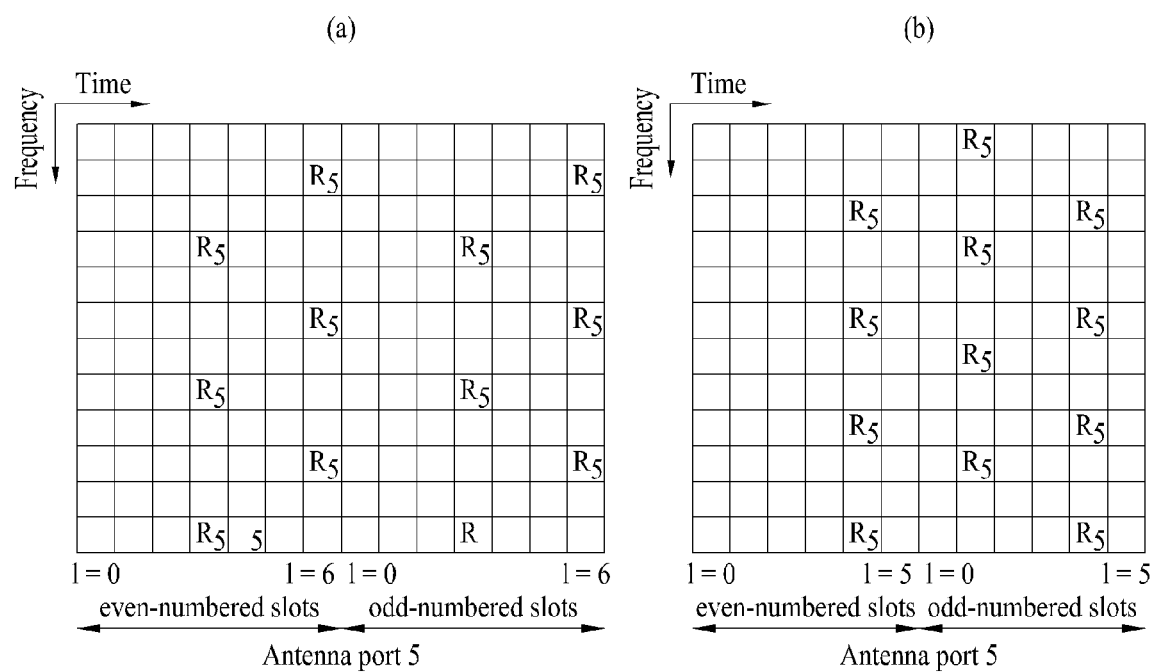
FIG. 10 is a diagram illustrating an example of DRS pattern for use in an LTE system.

FIG. 10 illustrates exemplary DRS patterns in an LTE system. Specifically, FIG. 10(a) illustrates a DRS pattern for a subframe with a normal CP and FIG. 10(b) illustrates a DRS pattern for a subframe with an extended CP. In FIG. 10, 'l' represents the position of an OFDM symbol in a slot.

REs on which DRSs can be transmitted (i.e. DRS REs) are generally preset, among the REs of an RB or an RB pair. Thus, a UE has only to detect a DRS(s) from an RE(s) at a preset position(s) among the REs of each RB or RB pair. For example, referring to FIG. 10, a BS transmits DRSs in one or more RB pairs through antenna port 5 in the pattern of FIG. 10(a) or 10(b). Hereinbelow, the positions of DRS REs in an RB or RB pair will be referred to as a DRS pattern in describing embodiments of the present invention.

In the LTE system supporting up to a maximum of one layer, a BS simultaneously transmits DRSs for demodulation of the layer and CRSs for estimation of a channel between a UE and the BS. If DRS is transmitted along with CRS, RS overhead is relatively increased as compared to the case of only CRS transmission. Specifically, it is possible to transmit multiple layers in the LTE-A system, such that CRS overhead is increased and data transmission efficiency is deteriorated. To avert this problem, the LTE-A system that can transmit more layers than the LTE system uses DRS and CSI-RS (channel state information RS) instead of CRSs that increase transmission overhead according to the number of physical antenna ports. The CSI-RSs are RSs introduced due to the fact that channel state does not greatly vary over time. Unlike a CRS transmitted in every subframe, the CSI-RS is transmitted at a transmission interval of a plurality of subframes. Due to such a transmission property of the CSI-RS, CSI-RS transmission overhead is lower than CRS transmission overhead. CSI-RS is a reference signal transmitted for channel estimation, and thus a demodulation RS for enabling the UE to demodulate reception data must be transmitted to the UE. For this purpose, DRS is utilized in the LTE-A system. For convenience of description, DRS will hereinafter be referred to as DMRS in the following embodiments.

FIG. 11 is a diagram illustrating DMRS patterns of antenna ports #7~#10.

In the case of multi-layer transmission, DMRS must be transmitted per layer, such that the number of DMRSs is increased in proportion to the number of layers. Assuming that DMRSs are transmitted through different resource elements (REs) within one RB pair, the number of RS REs is increased in proportion to the number of layers, such that data transmission efficiency is deteriorated. Therefore, if multiple DMRSs must be transmitted to reduce RS transmission overhead, one or more DMRSs are generally multiplexed and transmitted through a predetermined number of REs.

A base station (BS) capable of supporting a maximum of 4 transmission layers may multiplex and transmit a maximum of 4 transmission layers on one data RE. If the BS multiplexes and transmits 4 layers, it transmits not only the four layers but also four DMRSs corresponding to the four layers, respectively, and used for demodulation of each layer. The four DMRSs can be respectively transmitted in REs of two groups through 4 antenna ports. Referring to FIG. 11, antenna ports #7~#10 may transmit the corresponding DMRS through 12 REs within the RB pair. Referring to FIGS. 11(a) and 11(b), a radio resource for DMRS transmission of the antenna port #7 is identical to a radio resource for DMRS transmission of the antenna port #8. That is, DMRS of the antenna port #7 and DMRS of the antenna port #8 are identical to a radio resource for DMRS transmission of the antenna port #9 and a radio resource for DMRS transmission of the antenna port #10, as shown in FIGS. 11(c) and 11(d). However, a radio resource (hereinafter referred to as 'DMRS resource group 1') for DMRS transmission of the antenna ports #7 and #8 is different from a radio resource (hereinafter referred to as 'DMRS resource group 2') for DMRS transmission of the antenna ports #9 and #10. That is, DMRS of the antenna port #7 and DMRS of the antenna port #8 are multiplexed to DMRS resource group 1, such that they can be simultaneously transmitted. DMRS of the antenna port #9 and DMRS of the antenna port #10 are multiplexed to DMRS resource group #2, such that they can be simultaneously transmitted.

If multiple DMRSs are multiplexed in a predetermined radio resource as shown in FIG. 11, an orthogonal cover code (OCC) may be utilized to discriminate between DMRSs. For example, if DMRS is spread using the OCC having the length of 2, a maximum of two different DMRSs can be transmitted through one RE. In another example, if DMRS is spread using an OCC having the length of 4, a maximum of 4 different DMRSs can be multiplexed through one RE. For example, the Walsh-Hadamard code may be used as a representative OCC.

From among REs of one RB or REs of one RB pair, an aggregate of REs for transmission of DMRSs that can be spread by OCCs so as to be identified from each other is referred to as a CDM group. Referring to FIG. 11, DMRS resource group 1 corresponding to an aggregate of REs to which DMRSs of antenna ports #7 and #8 are allocated may configure one CDM group, and DMRS resource group 2 corresponding to an aggregate of REs to which DMRSs of the antenna ports #9 and #10 are allocated may configure another CDM group. In one pair of contiguous REs (hereinafter referred to as an RB pair), each CDM group of FIG. 11 includes 12 REs.

Figure 12:
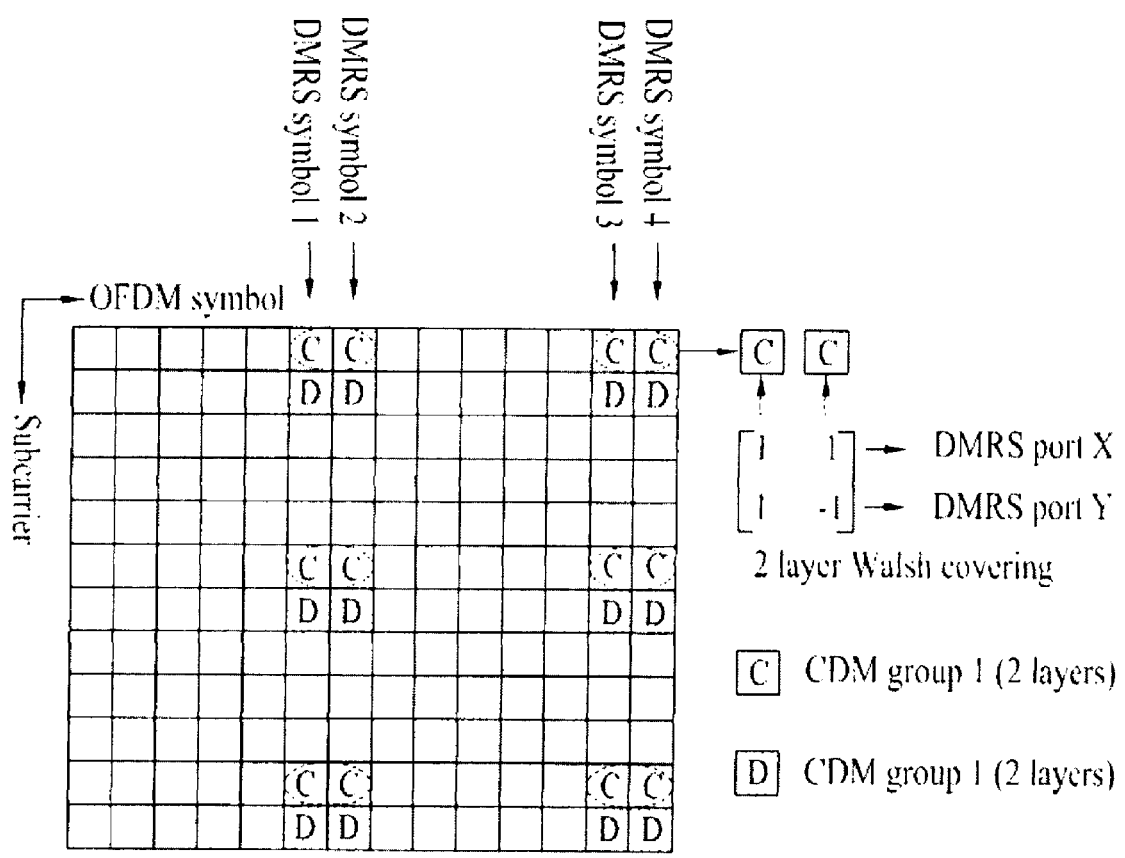
FIG. 12 shows resource elements (REs) obtained when DMRSs are multiplexed using an OCC having a length of 2.

FIG. 12 shows resource elements (REs) obtained when DMRSs are multiplexed using OCCs having the length of 2.

In the system capable of supporting a MIMO having a maximum rank of 4, a maximum of four DMRS sequences may be transmitted through two code division multiplexing (CDM) groups. Two DMRSs for each DRM group may be multiplexed by 2 OCC sequences each having the length of 2.

Antenna ports for transmitting DMRSx, DMRSy, DMRSz and DMRSw are defined as DMRS port X, DMRS port Y, DMRS port Z, and DMRS port W, respectively. In addition, it is assumed that two OCC sequences each having a length of 2 are represented by [1 1] and [1 −1]. The two OCC sequences may correspond to row-directional sequences of a 2×2 matrix shown in FIG. 12.

Referring to FIG. 12, DMRSx is spread by a sequence [1 1], DMRSy is spread by a sequence [1 −1], and the spread results may be allocated to CDM Group 1. DMRSz is spread by either one of the sequences [1 1] and [1 −1], DMRSw is spread by the remaining sequences, and the spread results may be allocated to CDM Group 2.

The RB pair shown in FIG. 12 may include a total of 4 DMRS symbols #1~#4. Some parts of the DMRSx spread by the sequence [1 1] and some parts of the DMRSy spread by the sequence [1 −1] may be allocated to DMRS Symbol 1. For example, DMRSx is spread to [1 1]×DMRSx=[DMRSx DMRSx] by the sequence [1 1], and DMRSy is spread to [1 −1]×DMRSy=[DMRSy −DMRSy] by the sequence [1 −1], such that first elements (DMRSx and DMRSy) may be allocated to DRMS Symbol 1 and second elements (DMRSx and −DMRSy) may be allocated to DMRS Symbol 2. In other words, (1×DMRSx)+(1×DMRSy) may be allocated to DMRS Symbol 1, and (1×DMRSx)+(−1×DMRSy) may be allocated to DMRS Symbol 2.

Figure 13:
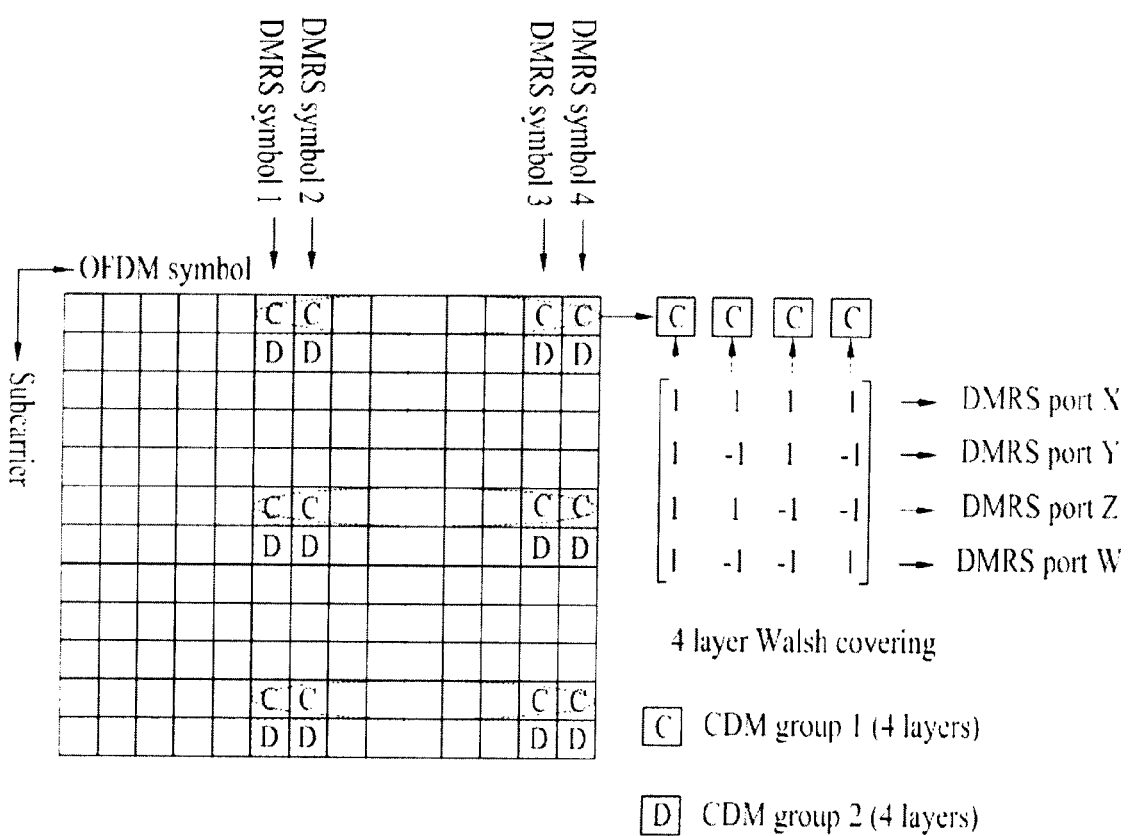
FIG. 13 shows resource elements (REs) obtained when DMRSs are multiplexed using an OCC having a length of 4.

FIG. 13 shows resource elements (REs) obtained when DMRSs are multiplexed using OCCs having a length of 4.

In a MIMO system for supporting a maximum rank of 8, a maximum of 8 DMRS sequences may be transmitted through 2 CDM groups. Four DMRSs may be multiplexed per CDM group, and may also be multiplexed by four OCC sequences having a length of 4. It is assumed that antenna ports for transmitting DMRSx, DMRSy, DMRSz, and DMRSw are represented by DMRS port X, DMRS port Y, DMRS port Z, and DMRS port W, respectively. In addition, four OCC sequences having a length of 4 are represented by [1 1 1 1], [1 −1 1 −1], [1 1 −1 −1], and [1 −1 −1 1], respectively. The four OCC sequences may correspond to row-directional sequences of a 4×4 matrix shown in FIG. 12.

Referring to FIG. 13, DMRSx is spread by a sequence [1 1 1 1], DMRSy is spread by a sequence [1 −1 1 −1], DMRSz is spread by a sequence [1 1 −1 −1], DMRSw is spread by a sequence [1 −1 −1 1], and the spread results may be allocated to CDM Group 1. Four DMRSs different from DMRSx, DMRSy, DMRSz, and DMRSw may be spread by [1 1 1 1], [1 −1 1 −1], [1 1 −1 −1], and [1 −1 −1 1], such that the spread results may be allocated to CDM Group 2.

The RB pair shown in FIG. 13 includes a total of 4 DMRS symbols #1~#4. Some parts of DMRSx, DMRSy, DMRSz, and DMRSw spread by the sequences [1 1 1 1], [−1 1 −1], [1 1 −1 −1], and [1 −1 −1 1] may be allocated to DMRS Symbol 1. For example, DMRSx is spread to [1 1 1 1]×DMRSx=[DMRSx DMRSx DMRSx DMRSx] by the sequence [1 1 1 1], DMRSy is spread to [1 −1 1 −1]×DMRSy=[DMRSy −DMRSy DMRSy −DMRSy] by the sequence [1 −1 1 −1], DMRSz is spread to [1 1 −1 −1]×DMRSz=[DMRSz DMRSz −DMRSz −DMRSz] by the sequence [1 1 −1 −1], and DMRSw is spread to [1 −1 −1 1]×DMRSw=[DMRSw −DMRSw −DMRSw DMRSw] by the sequence [1 −1 −1 1]. For example, from among the spread DMRS sequences, first elements (DMRSx, DMRSy, DMRSz, DMRSw) may be allocated to DMRS Symbol 1, second elements (DMRSx, −DMRSy, DMRSz, −DMRSw) may be allocated to DMRS Symbol 2, third elements (DMRSx, DMRSy, −DMRSz, −DMRSw) may be allocated to DMRS Symbol 3, and fourth elements (DMRSx, −DMRSy, −DMRSz, DMRSw) may be allocated to DMRS Symbol 4. That is, a component denoted by (1×DMRSx)+(1×DMRSy)+(1×DMRSz)+(1×DMRSw) is allocated to DMRS Symbol 1, a component denoted by (1×DMRSx)+(−1×DMRSy)+(1×DMRSz)+(−1×DMRSw) is allocated to DMRS Symbol 2, a component denoted by (1×DMRSx)+(1×DMRSy)+(−1×DMRSz)+(−1×DMRSw) is allocated to DMRS Symbol 3, and a component denoted by (1×DMRSx)+(−1×DMRSy)+(−1×DMRSz)+(1×DMRSw) is allocated to DMRS Symbol 4.

The DMRS pattern illustrated in FIG. 12 and the DMRS pattern illustrated in FIG. 13 may be carried out simultaneously or only either of them may be carried out in a wireless communication system. For example, the DMRS pattern of FIG. 12 may be used for a BS to multiplex one to four layers, for transmission, whereas the DMRS pattern of FIG. 13 may be used for a BS to multiplex five to eight layers, for transmission. In another example, one to eight layers may be multiplexed and transmitted using the DMRS pattern of FIG. 13. Notably, since a length of OCCs varies with the total number of layers transmitted by a BS in the former case, information indicating the total number of layers transmitted by the BS or a length of OCCs used for multiplexing the layers should be signaled to a UE explicitly or implicitly so that the UE may detect its layer using an OCC. For convenience of description and better understanding of the present invention, the embodiments of the present invention will hereinafter be described using an exemplary case in which the BS performs CDM multiplexing of fifth to eighth layers using OCCs having a length of 4 and transmits the CDM-multiplexed result. However, the following embodiments of the present invention can also be applied to an exemplary case in which one to four layers are multiplexed using OCCs having a length of 2.

In order for a UE to demodulate data transmitted to the UE, the UE can have to separate each transmission layer used for transmission of the data to the UE using channel information obtained through DMRS(s) transmitted by a BS along with the data. For this purpose, the UE has to separate a DMRS for its own data. In order to enable the UE to discriminate between a port that has transmitted a layer transmitted by the BS and a DMRS corresponding to the layer, the number of layers transmitted to a UE and a DMRS transmitted for the layers will hereinafter be described with reference to the following embodiments.

<Mapping of Layer to DMRS>

If a CDM group and an OCC used for DMRS extension for a UE from among 4 OCCs contained in the CDM group are specified, the UE may recover the DMRS. That is, provided that the UE can recognize whether its own DMRS has been transmitted from REs of CDM Group 1 or REs of CDM Group 2, and can also recognize whether its own DMRS has been spread with a certain OCC and the spread result has been multiplexed to the corresponding CDM group, the UE can detect its own DMRS that has been transmitted from the BS. For example, if the UE can recognize that its own DMRS has been spread with a first OCC within the CDM Group 1, the UE may multiply the first OCC by a signal transmitted on REs of the CDM Group 1, such that it can detect its own DMRS. For convenience of description and better understanding of the present invention, DMRSs spread by {1st OCC, 2nd OCC, 3rd OCC, 4th OCC} and transmitted in CDM Group 1 are represented by {1C, 2C, 3C, 4C}, respectively, and DMRSs spread by {1st OCC, 2nd OCC, 3rd OCC, 4th OCC} and transmitted in CDM Group 2 are represented by {1D, 2D, 3D, 4D}, respectively.

1. Case in which the Mapping Relationship Between all Layers and all DMRSs is Predetermined:

The mapping relationship between all DMRSs and all layers is predetermined, and DMRS may be specified on the basis of the predetermined mapping relationship. The mapping relationship between 8 DMRSs {1C, 2C, 3C, 4C, 1D, 2D, 3D, 4D} and 8 layers is represented by the following Table 1.

TABLE 1

| | Layer allocation rules for codes in two CDM groups | | | | | | | |
|---|---|---|---|---|---|---|---|---|
| | Layer-0 | Layer-1 | Layer-2 | Layer-3 | Layer-4 | Layer-5 | Layer-6 | Layer-7 |
| Type-1 | 1C | 2C | 1D | 2D | 3C | 4C | 3D | 4D |
| Type-2 | 1C | 2C | 1D | 2D | 3C | 3D | 4C | 4D |
| Type-3 | 1C | 2C | 1D | 2D | 3D | 3C | 4D | 4C |

TABLE 1-continued

Layer allocation rules for codes in two CDM groups

| | Layer-0 | Layer-1 | Layer-2 | Layer-3 | Layer-4 | Layer-5 | Layer-6 | Layer-7 |
|---|---|---|---|---|---|---|---|---|
| Type-4 | 1C | 2C | 1D | 2D | 4C | 4D | 3C | 3D |
| Type-5 | 1C | 2C | 3C | 4C | 1D | 2D | 3D | 4D |

If $K_{max}$ transmission antennas are contained in the BS, $K_{max}$ layers from Layer-1 to Layer-$K_{max}$ may be defined, and $K_{max}$ DMRSs may be mapped to $K_{max}$ layers on a one to one basis. For example, referring to Type-1, DMRSs are mapped to 8 layers from Layer-0 to Layer-7 in the order of 1C→2C→1D→2D→3C→4C→3D→4D. That is, DMRSs of Layer-0, Layer-1, Layer-4, and Layer-5 are spread to a first OCC, a second OCC, a third OCC and a fourth OCC, respectively, such that the spread DMRSs may be transmitted within CDM Group 1 and DMRSs of Layer-2, Layer-3, Layer-6 and Layer-7 are spread to $1^{st}$ OCC, $2^{nd}$ OCC, $3^{rd}$ OCC, and $4^{th}$ OCC, respectively, such that the spread results are transmitted in CDM Group 2. In so far as layers are mapped to DMRSs on a one to one basis, other mapping relationships different from Type-1 to Type-5 mapping relationships of Table 1 may be defined.

Meanwhile, layers from Layer-0 to Layer-7 shown in Table 1 are logical indexes assigned to discriminate among 8 layers for convenience of description. Since one layer is transmitted per antenna port, the mapping relationship between layers and DMRSs may also be considered to be the mapping relationship between antenna ports and DMRSs. Provided that the antenna port for transmitting the DMRS is referred to as a DMRS port, Table 1 may also be represented by the following Table 2.

TABLE 2

DMRS port (Port) allocation rules for codes in two CDM groups

| | Port-0 | Port-1 | Port-2 | Port-3 | Port-4 | Port-5 | Port-6 | Port-7 |
|---|---|---|---|---|---|---|---|---|
| Type-1 | 1C | 2C | 1D | 2D | 3C | 4C | 3D | 4D |
| Type-2 | 1C | 2C | 1D | 2D | 3C | 3D | 4C | 4D |
| Type-3 | 1C | 2C | 1D | 2D | 3D | 3C | 4D | 4C |
| Type-4 | 1C | 2C | 1D | 2D | 4C | 4D | 3C | 3D |
| Type-5 | 1C | 2C | 3C | 4C | 1D | 2D | 3D | 4D |

If $K_{max}$ transmission antenna ports are contained in the BS, $K_{max}$ antenna ports may respectively transmit DMRSs, and $K_{max}$ DMRSs may be mapped to $K_{max}$ antenna ports on a one to one basis. For example, as can be seen from Type-2, Port-0, Port-1, Port-4, and Port-6 may indicate that a DMRS spread by the $1^{st}$ OCC, a DMRS spread by the $2^{nd}$ OCC, a DMRS spread by the $3^{rd}$ OCC, and a DMRS spread by the $4^{th}$ OCC are transmitted in CDM Group 1, and Port-2, Port-3, Port-5, and Port-7 may indicate that a DMRS spread by the $1^{st}$ OCC, a DMRS spread by the $2^{nd}$ OCC, a DMRS spread by the $3^{rd}$ OCC, and a DMRS spread by the $4^{th}$ OCC are transmitted in CDM Group 2.

In a wireless communication system, a single mapping type (for example, Type-2) may be defined, and all UEs and all BSs for use in the wireless communication system may transmit/receive DMRSs using the single mapping type. Differently from the above-mentioned description, a plurality of mapping types may be defined in the wireless communication system, and the mapping types may be UE-specifically or BS-specifically used. If the mapping types may be UE-specifically or BS-specifically used, the mapping types available to a specific UE or a specific BS may be implicitly determined. Alternatively, information indicating whether DMRS is transmitted on the basis of a certain mapping type from among a plurality of mapping types may be signaled from a UE to a BS or from a BS or a UE so as to determine the mapping type. Embodiment 1-1 and Embodiment 1-2 may be applied to the case in which only one mapping type is defined in the wireless communication system. In addition, Embodiment 1-1 and Embodiment 1-2 may also be applied to another case in which several mapping types are defined and the multiple mapping types may be UE-specifically or BS-specifically used.

Based on a predetermined mapping relationship between layers and DMRSs, one or more layers may be allocated to one UE using Embodiments 1-1 to 1-3.

Embodiment 1-1

Fixed DMRS Set is Used Per Rank

The DMRS set may be predefined according to the number (i.e., rank) of layers allocated to the UE. For example, in the case of Rank-3 transmission, DMRSs corresponding to layers from Layer-0 to Layer-2 may be utilized in Table 1. If the mapping relationship of Type-1 is achieved between layers and DMRSs, DMRSs of {1C, 2C, 1D} may be adapted to transmit user data for one or more UEs receiving Rank-3 transmission. In so far as a DMRS set used for a specific rank is predefined, other DMRS sets (for example, {1D, 2D, 3D}) may be utilized for Rank-3 transmission.

Based on signaling from the BS or blind decoding of the UE, the UE can recognize how many layers have been allocated to the UE. Accordingly, according to Embodiment 1-1 in which a DMRS set is fixed per rank, the UE can detect its own DMRS(s) from among DMRSs transmitted from the BS. Moreover, the UE can demodulate UE data transmitted from one or more layers on the basis of the detected DMRS.

Embodiment 1-2

Contiguous DMRS(s) Starting from a Specific Layer are Used

An arbitrary DMRS set may be utilized to transmit the same rank during each transmission time. In this case, information indicating which DMRS set is used is transferred to the UE. For example, not only a rank for the UE but also a start DMRS may be adapted to indicate a DMRS set used for data transmission to the UE. Referring to Type-1 of Table 1, the UE may demodulate data transmitted to the UE using 4 DMRSs (i.e., {1D, 2D, 3C, 4D}) starting from 1D, namely, the UE may demodulate UE data through 4 layers corresponding to 4 DMRSs. In another example, provided that a start DMRS is set to a DMRS corresponding to Layer-6 of Table 1 and a rank is set to 3 (Rank-3), 3 DMRSs may start from 3D in Type-1 and may be cyclically allocated to the UE. That is, the UE may use the allocated DMRSs {3D, 4D, 1C} to demodulate a reception layer.

1-3. Mapping of Layer to DMRS According to Feedback Mode

The mapping relationship between layers and DMRSs may be separately defined according to the feedback mode. For example, during the SU-MIMO feedback mode, fixed DMRS(s) may be allocated to layer(s) for a UE as shown in Embodiment 1-1. During the MU-MIMO feedback mode, DMRS(s) not fixed as shown in Embodiment 1-2 are allocated to layer(s) for a UE, and information specifying the allocated DMRS(s) may be signaled to the UE.

2. Case in which the Mapping Relationship Between Layers and DMRSs is not Predefined:

Although the mapping relationship between a layer or DMRS port and a DMRS is not defined, DMRS(s) for a UE may be indicated.

2-1: Indicating Rank and CDM Group

It is assumed that one UE receives a maximum of 4 layers and only one CDM group can be adapted to transmit data toward one UE. In addition, assuming that one CDM group cannot be allocated to different UEs, the BS can transmit a plurality of layers to a maximum of 2 UEs using a maximum of 2 CDM groups. In this case, the BS may inform the UE of the number of layers allocated to the UE (i.e., CDM group to which a rank or a corresponding DMRS is transmitted), and the UE may specify DMRS(s) for data demodulation. For example, if the BS transmits three layers to a UE1 using CDM Group 1, the BS may inform the UE1 of information indicating Rank-3 and information indicating CDM Group 1. Based on the above-mentioned information, the UE1 can recognize that 3 DMRSs for the UE1 have been transmitted through CDM Group 1. The UE1 may detect three DMRSs from the signal received from CDM Group 1 using three OCCs {1st OCC, 2nd OCC, 3rd OCC} from among four OCCs {1st OCC, 2nd OCC, 3rd OCC, 4th OCC} On the other hand, if the UE transmits data to a UE1 and at the same time transmits two layers to a UE2 using CDM Group 2, the BS may inform the UE2 of information indicating Rank-2 and information indicating CDM Group 2. The UE2 may detect two DMRSs from the signal received from the CDM Group 2 using two OCCs {1st OCC, 2nd OCC} from among four OCCs {1st OCC, 2nd OCC, 3rd OCC, 4th OCC} available to CDM Group 2.

On the other hand, information indicating a CDM group may be composed of RRC signaling, and may be signaled to a UE at a longer period. Rank indication information may be signaled to a UE at each downlink transmission.

2-2: Indication of Rank and Start DMRS, and CDM Group

The BS may inform the UE of a rank allocated to the UE, a CDM group for DMRS transmission, and a start DMRS, such that the UE can specify DMRS(s) for data demodulation. The start DMRS of one CDM group may be signaled by specifying the start OCC from among OCCs available to one CDM group.

Rank and start DMRS, and DMRSs transmitted in the used CDM group may be changed according to a method for allocating the CDM group to the UE. Therefore, Embodiment 2-2 illustrates one case (1) in which only one CDM group can be allocated to one UE and another case (2) in which one or two CDM groups can be allocated to one UE.

(1) Case in which One CDM Group is Allocated to One UE

Only one CDM group can be allocated per UE. That is, the BS may be configured not to allocate a CDM group allocated to one UE to another UE. That is, it is assumed that only one CDM group is used for data transmission toward one UE and the CDM group for use in the UE cannot be utilized by another UE. In this case, the BS can transmit a plurality of layers to a maximum of two UEs using a maximum of two CDM groups. The BS may inform the UE of the number of layers allocated to the UE (i.e., a rank and a used CDM group) and a start DMRS from among DMRSs used in the CDM group, such that the UE can specify DMRS(s) needed for data demodulation. For example, if the BS multiplexes 3 layers using three DMRSs {1C, 2C, 3C} and transmits the three multiplexed DMRSs to a UE1, the BS may inform the UE1 of information indicating Rank-3, information indicating CDM Group 1, and information indicating a start DMRS (1C). Based on the above-mentioned information, the UE1 may detect DMRSs capable of being transmitted in CDM Group 1. For example, the UE may detect three DMRSs {1C, 2C, 3C} starting from DMRS 1C from among four DMRSs {1C, 2C, 3C, 4C}. The UE1 may demodulate data transmitted for the UE1 using the detected DMRS. On the other hand, in the case where data of the UE1 is transmitted and at the same time the BS multiplexes two layers using {2D, 3D} and transmits the two multiplexed layers to the UE2, the BS may inform the UE2 of information indicating Rank-2, information indicating CDM Group 2, and information indicating a start DMRS (2D). Based on the above-mentioned information, the UE2 may detect DMRSs (for example, two DMRSs {2D, 3D} starting from 1D from among four DMRSs {1D, 2D, 3D, 4D}) capable of being transmitted in the CDM group 2. The UE2 can demodulate data transmitted for the UE2 using the detected DMRS.

Meanwhile, it is assumed that only one CDM group is used for data transmission toward one UE and a CDM group used for the UE can also be applied to another UE. In this case, the BS may multiplex data for a maximum of 8 UEs to a predetermined radio resource using a maximum of 2 CDM groups. In this case, the BS may inform the UE of the number of layers allocated to the UE (i.e., a rank and a used CDM group) and a start DMRS from among DMRSs used in the CDM group, such that the UE can specify DMRS(s) needed for data demodulation. For example, it is assumed that the BS transmits three layers allocated to a UE1 and three DMRSs {1C, 2C, 3C}, transmits DMRSs {2D, 3D} together with two layers allocated to a UE2, and transmits a DMRS 4D along with one layer allocated to a UE3. The BS may inform the UE1 of information indicating Rank-3, information indicating CDM Group 1, and information indicating a start DMRS (1C), may inform the UE2 of information indicating Rank-2, information indicating CDM Group 2, and information indicating a start DMRS (2D), and may inform a UE3 of information indicating a start DMRS (1C), may inform the UE2 of information indicating Rank-1, information indicating CDM Group 2, and information indicating a start DMRS (4D). From among DMRSs capable of being transmitted on CDM Group 1 on the basis of information transmitted to the UE1, the UE1 detects three DMRSs {1C, 2C, 3C} starting from 1C, and can demodulate data transmitted for the UE1. In addition, the UE2 detects two DMRSs {2D, 3D} from among DMRSs {1D, 2D, 3D, 4D} capable of being transmitted on CDM Group 2 on the basis of information transmitted to the UE2, such that it can demodulate data transmitted for the UE2. In addition, the UE3 can detect a DMRS 4D from among DMRSs capable of being transmitted on CDM Group 2 on the basis of information transmitted to the UE3, such that it can demodulate data transmitted for the UE3.

(2) One or Two CDM Groups are Allocated to CDM Group of One UE

If necessary, the CDM group allocated to another UE may also be allocated to one UE. That is, the BS may allocate the CDM group allocated to one UE to another UE as necessary.

It is assumed that one or two CDM groups can be used to transmit data to one UE. The BS can multiplex data for a maximum of 8 UEs using a maximum of two CDM groups. For example, it is assumed that the BS allocates three layers to a UE3, and not only three layers but also DMRSs {3C, 4C, 1D} corresponding to the three layers can be transmitted to the UE3. The BS may inform the UE3 of information indicating CDM Group 1, information indicating the number (i.e., 2) of DMRSs used in the CDM Group 1, information indicating a start DMS (1C) of the CDM Group 1, information indicating CDM Group 2, information indicating the number (i.e., 1) of DMRSs used in the CDM Group 2, and information indicating a start DMRS (1D) of the CDM Group 2. The UE3 detects two DMRSs {3C, 4C} starting from 3C from among DMRSs {1C, 2C, 3C, 4C} capable of being transmitted on CDM Group 1 on the basis of the above-mentioned information, and detects one DMRS (1D) defined as a start DMRS from among DMRSs {1D, 2D, 3D, 4D} capable of being transmitted on CDM Group 2, such that it can demodulate data transmitted for UE3.

In accordance with Embodiment 2-2 of the present invention, information indicating the CDM group is configured by RRC signaling such that it can be signaled to a UE in a long-term manner. Rank information indicating the rank and start DMRS information indicating the start DMRS (or start OCC) may be signaled to the UE at every downlink transmission.

2-3: DMRS Set Indication Rule According to UE Class

A maximum number of supportable ranks may be changed per UE. It is possible to classify classes for UEs on the basis of a supportable rank, and a method for informing the UE of the corresponding DMRS according to the UE class may be changed. In association with a UE capable of receiving a maximum of 4 layers, a CDM group and a rank may be signaled from the BS according to the embodiment 2-1. In association with a UE capable of receiving at least 5 layers, according to embodiment 2-2, information indicating a CDM group and a rank may be signaled from the BS, and information indicating a start DMRS from among DMRSs used in the CDM group may also be signaled from the BS.

3. Use of DMRS Subset

If $K_{max}$ DMRSs are defined for $K_{max}$ layers, the subset of the $K_{max}$ DMRSs may be UE-specifically or cell-specifically used as necessary. Information indicating which subset from among DMRSs is used may be indicated to a bitmap or a predefined group index. Information indicating a DMRS subset may be configured by RRC or higher layer signaling, and the resultant information may be transferred to the UE.

For example, provided that Type-1 of Table 1 or Table 2 is used in a predetermined system, DMRSs {1C, 2C, 1D, 2D, 3C, 4C, 3D, 4D} may be utilized for 8 layers or 8 DMRS ports. The BS may limit available DMRSs from among all DMRSs {1C, 2C, 1D, 2D, 3C, 4C, 3D, 4D} to a subset of DMRSs {1D, 2D, 3D, 4D}, and may inform the UE of information indicating the DMRS subset. The UE may feed back transmission of a maximum of Rank-4, and the BS may transmit DMRS(s) corresponding to one or more layers transmitted to the UE on the basis of the layer-to-DMRS mapping relationship {1D: Layer-0, 2D: Layer-1, 3D: Layer-2, 4D: Layer-3}. In addition, the BS may inform the UE of information (hereinafter referred to as DMRS indication information) indicating a DMRS that has been transmitted for the UE according to Embodiment 1-1 or Embodiment 1-2. The UE may detect a DMRS corresponding to a layer allocated to the UE according to Embodiment 1-1 or Embodiment 1-2, and the UE may demodulate a layer allocated to the UE using the detected DMRS. The BS may transmit or receive DMRSs to the UE on the basis of the mapping relationship {1D: Port-0, 2D: Port-1, 3D: Port-2, 4D: Port-3} between DMRS ports and DMRSs.

In another example, available DMRSs from among DMRSs {1C, 2C, 3C, 4C} of CDM Group 1 and DMRSs {1D, 2D, 3D, 4D} of CDM Group 2 are limited to a subset of DMRSs {1C, 2C, 1D, 2D}, and information regarding the DMRS subset may be signaled to the UE. The BS may allocate a maximum of 4 layers to the UE using the DMRS subset {1C, 2C, 1D, 2D}. If the BS transmits one or more layers and DMRSs for demodulating the allocated layers to the UE, the BS may inform the UE of indication information regarding DMRSs allocated for the UE according to any one of embodiments 2-1 to 2-3. In accordance with any one of Embodiments 2-1 to 2-3, the UE may detect a DMRS corresponding to a layer allocated to the UE on the basis of the DMRS indication information, and the UE may demodulate the allocated layer on the basis of the detected DMRS.

In accordance with any one of the above-mentioned embodiments 1-1 to 3, the BS processor 400*b* may allocate a DMRS for each layer to be transmitted to a UE. In addition, according to any one of embodiments 1-1 to 3, the BS processor 400*b* may spread a DMRS allocated to the UE with a predetermined OCC, and multiplex the spread result in a predetermined CDM group. In order to detect DMRS(s) allocated to the UE, the BS processor 400*b* may control the BS transmitter 100*b* to generate information for specifying/indicating DMRS(s) according to any one of embodiments 1-1 to 3, as well as to transmit the generated information to the UE. For example, the BS processor 400*b* may generate information indicating a mapping type, information indicating OCC(s) used for spreading the DMRS(s), and information indicting CDM group(s) to which the DMRS(s) are transmitted. Under control of the BS processor 400*b*, the BS transmitter 100*b* transmits each DMRS port allocated to the UE to each layer and each DMRS of the UE. In addition, under the control of the BS processor 400*b*, the BS transmitter 100*b* may transmit information for specifying/indicating the DMRS to the UE.

Under the control of the UE processor 400*a*, the UE receiver 300*a* can detect DMRSs transmitted for the UE according to any one of embodiments 1-1 to 3. The UE processor 400*a* may control the UE receiver 300*a* to detect DMRS(s) of the UE according to any one of embodiments 1-1 to 3. In accordance with any one of embodiments 1-1 to 3, if the BS transmits information for specifying/indicating DMRS(s), the UE receiver 300*a* receives the above-mentioned information and transmits the received information to the UE processor 400*a*. In accordance with the corresponding embodiment, the UE processor 400*a* may control the UE receiver 300*a* to detect the DMRS on the basis of the above-mentioned information. The UE processor 400*a* may control the UE receiver 300*a* to detect/receive the corresponding layer on the basis of the detected DMRS.

<DMRS Port Allocation>

The above-mentioned embodiments have disclosed a method for allocating a DMRS to a UE and a method for signaling indication information of the allocated DMRS. In accordance with any one of embodiments 1-1 to 3, the BS allocates DMRS(s) to transmission layer(s), and transmits information specifying the allocated DMRS to a UE.

Figure 14:
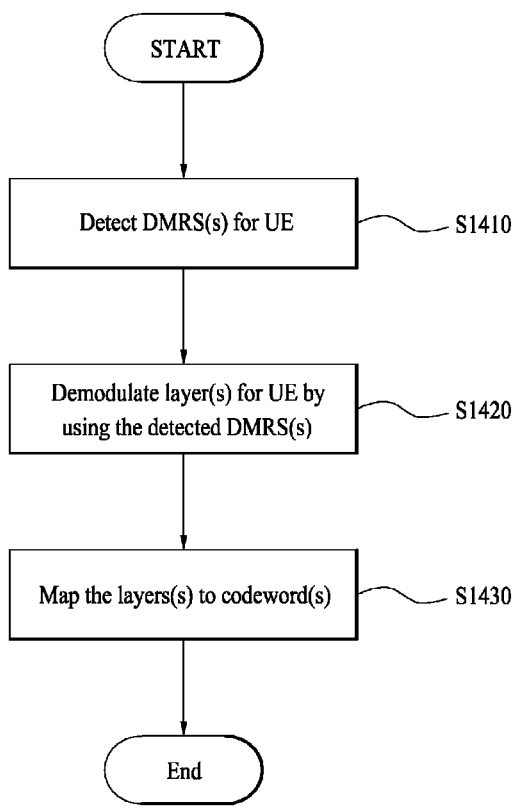
FIG. 14 is a flowchart illustrating a method for processing data using a DMRS.

FIG. 14 is a flowchart illustrating a method for processing data using a DMRS.

Referring to FIG. 14, according to any one of embodiments 1-1 to 3, the UE can detect DMRS(s) transmitted thereto (Step S1410). The UE may demodulate layer(s) allocated/transmitted to the UE on the basis of the detected DMRS(s) (Step S1420). The UE may recover the demodulated layer(s) to one or more codewords (Step S1430).

Table 3 shows the mapping relationship between a codeword and a layer for spatial multiplexing according to rank.

TABLE 3

| Rank | Codeword | Layer |
|---|---|---|
| 1 | CW-0 | layer-0 |
| 2 | CW-0 | layer-0 |
|   | CW-1 | layer-1 |
| 3 | CW-0 | layer-0 |
|   | CW 1 | layer 1, layer 2 |
| 4 | CW-0 | layer-0, layer-1 |
|   | CW-1 | layer-2, layer-3 |
| 5 | CW-0 | layer-0, layer-1 |
|   | CW-1 | layer-2, layer-3, layer-4 |
| 6 | CW-0 | layer-0, layer-1, layer-2 |
|   | CW-1 | layer-3, layer-4, layer-5 |
| 7 | CW-0 | layer-0, layer-1, layer-2 |
|   | CW-1 | layer-3, layer-4, layer-5, layer-6 |
| 8 | CW-0 | layer-0, layer-1, layer-2, layer-3 |
|   | CW 1 | layer 4, layer 5, layer 6, layer 7 |

In Table 3, layer indexes are considered to be logical indexes that are assigned in order from a layer belonging to CW-0 to a layer belonging to CW-1 so as to discriminate among layers. Although Table 3 exemplarily shows transmission of a maximum of 2 codewords, the mapping relationship between a codeword and a layer can also be defined even in the case where two or more codewords are transmitted. If the mapping relationship between a codeword and a layer is defined, the embodiments of the present invention can be used in the same manner as in transmission of a maximum of two codewords.

If the antenna port for transmitting a specific DMRS is predefined, the UE can detect a DMRS transmitted thereto according to any one of the above-mentioned embodiments. However, if information as to which port is used to transmit a layer transmission and information as to which codeword is mapped to the layer are not defined, the UE cannot recognize a codeword to which the detected layer pertains, such that it is impossible to properly recover the codeword. For example, as can be seen from Table 3, in the case of Rank-4, the BS modulates a codeword CW-0 into Layer-0 and Layer-1 and transmits the modulated layers to the UE2. In addition, the BS may modulate a codeword CW-1 into Layer-2 and Layer-3, and transmit the modulated layers to the UE2. In accordance with any one of embodiments 1-1 to 3, the BS may transmit the above-mentioned layers together with DMRSs, and may signal indication information of the corresponding DMRS to each UE. The UE1 and the UE2 detect a DMRS according to the corresponding embodiment, such that each of the UE1 and UE2 can detect two layers.

However, if the mapping relationship between a DMRS port and a layer is not defined, not only information as to which one of antenna ports is used for a layer to be transmitted, but also information as to which one of codewords is mapped to the layer are unclear, such that it is impossible to properly recover a codeword only using the layer-to-codeword mapping relationship. Alternatively, if the mapping relationship between a DMRS port and a layer is defined, the UE detects only a DMRS allocated to the UE, such that it can identify which antenna port has been used to transmit a layer allocated to the UE. In this case, the UE can recover a codeword to be transmitted from the BS to the UE on the basis of the layer-to-codeword mapping relationship.

Hereinafter, an antenna port for DMRS transmission is referred to as a DMRS port. In addition, assuming that 8 DMRS ports are mapped to DMRSs as shown in Table 4, the embodiments for the mapping relationship between a DMRS port and a layer will hereinafter be described in detail. For convenience of description and better understanding of the present invention, the 8 DMRS ports are indexed from 'Port-0' to 'Antenna Port-7'.

TABLE 4

| DMRS port (Port) | | | | | | | | |
|---|---|---|---|---|---|---|---|---|
|  | Port-0 | Port-1 | Port-2 | Port-3 | Port-4 | Port-5 | Port-6 | Port-7 |
| DMRS | 1C | 2C | 1D | 2D | 3C | 3D | 4C | 4D |

For example, layer(s) and DMRS port(s) of the codeword are mapped as shown in Table 5 or Table 6.

TABLE 5

| Rank | Codeword | Layer | DMRS port (Port) |
|---|---|---|---|
| 1 | CW-0 | layer-0 | Port-0 |
| 2 | CW-0 | layer-0 | Port-0 |
|   | CW-1 | layer-1 | Port-1 |
| 3 | CW-0 | layer-0 | Port-0 |
|   | CW-1 | layer-1, layer-2 | Port-1, Port-2 |
| 4 | CW-0 | layer-0, layer-1 | Port-0, Port-1 |
|   | CW-1 | layer-2, layer-3 | Port-2, Port-3 |
| 5 | CW-0 | layer-0, layer-1 | Port-0, Port-1 |
|   | CW-1 | layer-2, layer-3, layer-4 | Port-2, Port-3, Port-4 |
| 6 | CW-0 | layer-0, layer-1, layer-2 | Port-0, Port-1, Port-2 |
|   | CW-1 | layer-3, layer-4, layer-5 | Port-3, Port-4, Port-5 |
| 7 | CW 0 | layer 0, layer 1, layer 2 | Port 0, Port 1, Port 2 |
|   | CW-1 | layer-3, layer-4, layer-5, layer-6 | Port-3, Port-4, Port-5, Port-6 |
| 8 | CW-0 | layer-0, layer-1, layer-2, layer-3 | Port-0, Port-1, Port-2, Port-3 |
|   | CW-1 | layer-4, layer-5, layer-6, layer-7 | Port-4, Port-5, Port-6, Port-7 |

TABLE 6

| Rank | Codeword | Layer | DMRS port (Port) |
|---|---|---|---|
| 1 | CW-0 | layer 0 | Port 0 |
| 2 | CW-0 | layer-0 | Port-0 |
|   | CW-1 | layer-1 | Port-1 |
| 3 | CW-0 | layer-0 | Port-0 |
|   | CW-1 | layer-1, layer-2 | Port-2, Port-3 |
| 4 | CW 0 | layer 0, layer 1 | Port 0, Port 1 |
|   | CW-1 | layer-2, layer-3 | Port-2, Port-3 |
| 5 | CW-0 | layer-0, layer-1 | Port-0, Port-1 |
|   | CW-1 | layer-2, layer-3, layer-4 | Port-2, Port-3, Port-6 |
| 6 | CW-0 | layer-0, layer-1, layer-2 | Port-0, Port-1, Port-4 |
|   | CW-1 | layer-3, layer-4, layer-5 | Port-2, Port-3, Port-6 |
| 7 | CW-0 | layer-0, layer-1, layer-2 | Port-0, Port-1, Port-4 |
|   | CW-1 | layer-3, layer-4, layer-5, layer-6 | Port-2, Port-3, Port-6, Port-7 |
| 8 | CW-0 | layer-0, layer-1, layer-2, layer-3 | Port-0, Port-1, Port-4, Port-5 |
|   | CW-1 | layer-4, layer-5, layer-6, layer-7 | Port-2, Port-3, Port-6, Port-7 |

In Tables 4 to 6, layer indexes are used as logical indexes assigned to discriminate among layers according to transmission rank. Accordingly, Tables 5 and 6 may also be represented by the mapping relationship between antenna ports and codewords. That is, the embodiment of Table 5 may be represented by the mapping relationship between a DMRS port and a codeword as shown in Table 7, and the embodiment of Table 6 may also be represented by the mapping relationship between a DMRS port and a codeword as shown in Table 8.

TABLE 7

| Rank | Codeword | DMRS port (Port) |
|---|---|---|
| 1 | CW-0 | Port-0 |
| 2 | CW-0 | Port-0 |
|   | CW-1 | Port-1 |
| 3 | CW 0 | Port 0 |
|   | CW-1 | Port-1, Port-2 |
| 4 | CW-0 | Port-0, Port-1 |
|   | CW-1 | Port-2, Port-3 |
| 5 | CW-0 | Port-0, Port-1 |
|   | CW-1 | Port-2, Port-3, Port-4 |
| 6 | CW-0 | Port-0, Port-1, Port-2 |
|   | CW-1 | Port-3, Port-4, Port-5 |
| 7 | CW-0 | Port-0, Port-1, Port-2 |
|   | CW-1 | Port-3, Port-4, Port-5, Port-6 |
| 8 | CW-0 | Port-0, Port-1, Port-2, Port-3 |
|   | CW-1 | Port-4, Port-5, Port-6, Port-7 |

TABLE 8

| Rank | Codeword | DMRS port (Port) |
|---|---|---|
| 1 | CW-0 | Port 0 |
| 2 | CW-0 | Port-0 |
|   | CW-1 | Port-1 |
| 3 | CW 0 | Port 0 |
|   | CW-1 | Port-2, Port-3 |
| 4 | CW-0 | Port-0, Port-1 |
|   | CW-1 | Port-2, Port-3 |
| 5 | CW-0 | Port-0, Port-1 |
|   | CW-1 | Port-2, Port-3, Port-6 |
| 6 | CW-0 | Port-0, Port-1, Port-4 |
|   | CW-1 | Port-2, Port-3, Port-6 |
| 7 | CW-0 | Port-0, Port-1, Port-4 |
|   | CW-1 | Port-2, Port-3, Port-6, Port-7 |
| 8 | CW-0 | Port-0, Port-1, Port-4, Port-5 |
|   | CW-1 | Port-2, Port-3, Port-6, Port-7 |

4. The Mapping of a Codeword to a DMRS Port as Shown in Table 5 or Table 7

Referring to Table 5 or Table 7, when transmitting three layers to a UE, the BS transmits one layer corresponding to CW-0 through Port-0, and transmits two layers corresponding to CW-1 through Port-1 and Port-2. Provided that a transmission DMRS for each port is determined according to Table 4, the BS transmits a DMRS 1C at Port-0 and transmits a DMRS 2C at Port-2, and transmits a DMRS (2C) at Port-1 and transmits a DMRS (1D) at Port-2. In addition, the BS may transmit information indicating DMRSs 1C, 2C and 1D to the UE according to any one of the embodiments 1-1 to 3. The UE can detect DMRSs 1C, 2C and 1D respectively transmitted at Port-0, Port-1, and Port-2 on the basis of the above-mentioned indication information, and can demodulate three layers using the detected DMRSs. In addition, the UE may recover one codeword from a layer transmitted at Port-0 from among the three layers, and may also recover another codeword transmitted either from a layer transmitted at Port-1 or from a layer transmitted at Port-2. Therefore, the UE can obtain two codewords transmitted from the BS to the UE.

5. The Mapping of a Codeword to a DMRS Port as Shown in Table 6 or Table 8

Referring to Table 6 or Table 8, the BS can transmit one layer corresponding to CW-0 through Port-0, and can transmit two layers corresponding to CW-1 through Port-2 and Port-3. Assuming that a transmission DMRS for each port is determined according to Table 4, the BS transmits a DMRS (1C) at Port-0, transmits a DMRS (1D) at Port-2, and transmits a DMRS (2D) at Port-3. The BS can transmit information indicating DMRSs 1C, 1D and 2D to the UE according to any one of the above-mentioned embodiments 1-1 to 3. The UE can detect DMRS 1C, DMRS 1D, and DMRS 2D respectively transmitted at Port-0, Port-2, and Port-3 on the basis of the above-mentioned indication information, and can demodulate three layers using the detected DMRSs. In addition, the UE can recover one codeword from a layer transmitted at Port-0 from among the three layers, and can recover a layer transmitted at Port-2 and another codeword from a layer transmitted at Port-3.

Embodiment 4 or Embodiment 5 is combined with any one of Embodiments 1-1 to 3 so as to be implemented by the BS and the UE.

The BS processor 400b configures one or more codewords using one or more layers, controls the BS transmitter 100b such that each layer can be transmitted through the corresponding DMRS port according to Embodiment 4 or Embodiment 5. In addition, the BS processor 400b can spread one or more DMRSs for one or more layers according to any one of the embodiments 1-1 to 3, and can allocate the spread DMRS(s) to one or two CDM groups. Under the control of the BS processor 400b, the BS transmitter 100b may transmit the one or more DMRSs along with the one or more layers at the corresponding antenna port.

The UE processor 100a can detect DMRS(s) allocated to the UE according to any one of the embodiments 1-1 to 3, and can detect/receive the corresponding layer(s) using the detected DMRS(s). Under the control of the UE processor 100a, the UE receiver 300a detects the DMRS(s) allocated to the UE, and can detect/receive the corresponding layer(s) using the detected DMRS(s). The UE processor 100a may recover the detected layer(s) using one or more codewords according to Embodiment 4 or Embodiment 5.

<Downlink Control Signaling for Dynamic Switching>

The above-mentioned embodiments have mainly disclosed that a DMRS port for each rank is predefined. For example, according to Embodiment 4, DMRS Port-0 is used for Rank-1 transmission, and DMRS Port-0, DMRS Port-1, and DMRS Port-2 are used for Rank-3 transmission. According to Embodiment 5, DMRS Port-0 is used for Rank-1 transmission, and DMRS Port-0, DMRS Port-2, and DMRS Port-3 are used for Rank-3 transmission. As can be seen from Tables 5 to 8, during Rank-1 transmission, DMRS is transmitted only through Port-0 and a single codeword is transmitted only to Rank-1.

In accordance with the legacy standard, during transmission of a single codeword, the corresponding data is transmitted only to Rank-1 through Port-0 as shown in Tables 5 to 8. For example, under the condition that the BS desires to transmit a TB (hereinafter referred to as TB1) to a UE1 of the SU-MTMO mode and desires to transmit a TB (hereinafter referred to as TB2) to a UE2 of the SU-MIMO mode, the BS performs Rank-1 transmission of a codeword of TB1 to the UE1 through DMRS Port-0 according to the legacy standard, and performs Rank-1 transmission of a codeword of TB2 to the UE2 through DMRS Port-0 at another time resource. If the BS desires to simultaneously transmit a TB1 and a TB2 to a UE1 and a UE2 in a MU-MIMO mode, the UE1 and the UE2 must reconfigure their system in the MU-MIMO mode, such that the UE1 and the UE2 can detect their own TBs from among TB1 and TB2. However, semi-static switching capable of reconfiguring the system by higher layer signaling requires a relatively longer time for mode switching as compared to dynamic switching by PDCCH or the like. Therefore, various embodiments for switching a dynamic mode between an SU-MIMO and an MU-MIMO will hereinafter be described in detail.

In order to switch transmission modes between SU-MIMO and MU-MIMO by dynamic switching, it is necessary to indicate another DMRS port at the same rank.

Various embodiments regarding a method for indicating a DMRS port at a predetermined rank in such a manner that a port for DMRS transmission is changed at the predetermined rank will hereinafter be described in detail. In addition, other embodiments regarding a method for indicating a DMRS port at single codeword/TB transmission caused by multi-layer transmission will also be described. Although the embodiments of the present invention will hereinafter be described using transmission of a maximum of 2 codewords as an example, it should be noted that the following embodiments can also be applied to the other case in which two or more codewords are transmitted.

By any DCI format (for example, Format 2, Format 2A, Format 2B, or Format 2C) related to spatial multiplexing, a deactivated TB (also called a disabled TB) from among multiple codewords may be indicated. The BS according to the embodiments of the present invention indicates a DMRS port using a New Data Indicator (NDI) for each TB, resulting in MU-MIMO transmission. In DCI Format 2, 2A, 2B or 2C, each TB may include an MCS field, an NDI field, a Redundancy Version (RV) field, etc. The MCS field indicates an MCS level of the corresponding TB, and the RV field indicates '$rv_{idx}$' of the corresponding TB. The conventional NDI field is used to indicate an antenna port for single antenna port transmission (one TB disable). In more detail, if an NDI of the disabled TB is set to 0, Antenna Port #7 is used for single antenna port transmission. If an NDI of the disabled TB is set to 1, Antenna Port #8 is used for single antenna port transmission.

Meanwhile, a TB may be disabled according to values established in DCI formats 2, 2A, 2B, and 2C. For example, in DCI Formats 2, 2A, 2B, 2C, if an MCS level indicated in an MCS field corresponding to a predetermined TB is denoted by $I_{MCS}=0$ and an RV indicated by the RV field is denoted by $rv_{idx}=1$, the predetermined TB is enabled. The disabled TB is not transmitted, and only the enabled TB is transmitted.

Table 9 shows one example for supporting DMRS port indication either at Rank-1 transmission or at single TB transmission caused by multiple layers.

TABLE 9

| TBs and NDI | Rank indication | Indicated DMRS index set |
|---|---|---|
| One TB is disabled (NDI = 0 in disabled TB) | 1 | Port-0 |
| One TB is disabled (NDI = 1 in disabled TB) |  | Port-1 |
| No disabled TBs | 2 | Port-0, Port-1 |
| One TB is disabled | 2 | Port-0, Port-1 |
| No disabled TBs | 3 | Port-0, Port-1, Port-2 |
| One TB is disabled | 3 | Port-0, Port-1, Port 2 |
| No disabled TBs | 4 | Port-0, Port-1, Port-2, Port-3 |
| One TB is disabled | 4 | Port-0, Port-1, Port-2, Port-3 |
| No disabled TBs | 5 | Port-0, Port-1, Port-2, Port-3, Port-4 |
| No disabled TBs | 6 | Port-0, Port-1, Port-2, Port-3, Port-4, Port-5 |
| No disabled TBs | 7 | Port-0, Port-1, Port-2, Port-3, Port-4, Port-5, Port-6 |
| No disabled TBs | 8 | Port-0, Port-1, Port-2, Port-3, Port-4, Port-5, Port-6, Port-7 |

In Table 9, single codeword transmission disables one TB from among two TBs using a DCI such that it can be signaled to a UE. Particularly, an NDI exemplarily shows that a DMRS port is indicated only in Rank-1 transmission. Referring to Table 9, the BS may transmit a layer of TB1 to a UE1 through DMRS Port-0 as an example. In this case, the BS may configure downlink control information of the UE1 in such a manner that disablement of TB2 is represented by such downlink control information. In addition, the BS may transmit downlink control information in which an NDI for the disabled TB2 is set to 0. The UE1 detects downlink control information of the UE1 using blind decoding. Based on the NDI assigned to 0, the UE1 can recognize that a layer of a disabled TB1 has been transmitted through DMRS Port-0. The UE1 detects a DMRS transmitted at DMRS Port-0, and can recover a layer transmitted for the UE1 into the TB1 using the detected DMRS. In addition, the BS may transmit a layer of the TB2 to a UE2 through DMRS Port-0. The BS configures downlink control information of the UE2 so as to indicate disablement of TB1, and transmits the configured information to the UE2. In addition, the BS configures downlink control information of the UE2 in such a manner that an NDI for the TB1 is set to 0, such that resultant UE2 downlink control information can be transmitted to the UE2. The UE2 detects the UE2 downlink control information by blind decoding, and can recognize that a layer of an enabled TB2 has been transmitted through DMRS Port-1 on the basis of NDI assigned to 1 (NDI=1). The BS may perform SU-MIMO transmission in which TB1 and TB2 are transmitted through different time zones. In the same time zone, the BS may also perform MU-MIMO transmission in which TB1 is transmitted at DMRS Port-0 and TB2 is transmitted at DMRS Port-1. From the viewpoint of UE1 and UE2, it can be recognized that the BS has transmitted a single codeword on the basis of the corresponding downlink control information, such that the UE1 and the UE2 can detect the corresponding layer without changing the system parameter from SU-MIMO to MU-MIMO. The above-mentioned single codeword transmission for each UE may be used only in retransmission and/or initial transmission.

Table 9 exemplarily shows that a DMRS port is indicated only in Rank-1 transmission. However, even in the case of single codeword transmission caused by multiple layers, used DMRS ports are changed, and the used DMRS port set may be indicated by NDI setting for a disabled TB. Table 10 shows another example for supporting DMRS port indication either at Rank-1 transmission or at single TB transmission caused by multiple layers.

TABLE 10

| TBs and NDI | Rank indication | Indicated DM RS index set |
|---|---|---|
| One TB is disabled (NDI = 0 in disabled TB) | 1 | Port 0 |
| One TB is disabled (NDI = 1 in disabled TB) |  | Port 1 |
| No disabled TBs | 2 | Port-0, Port-1 |
| One TB is disabled (NDI = 0 in disabled TB) | 2 | Port-0, Port-1 |
| One TB is disabled (NDI = 1 in disabled TB) | 2 | {Port-0, Port-1} or {Port-4, Port-6} or reserved |
| No disabled TBs | 3 | Port-0, Port-1, Port-2 |
| One TB is disabled (NDI = 0 in disabled TB) | 3 | Port-0, Port-1, Port-2 |
| One TB is disabled (NDI = 1 in disabled TB) | 3 | Port-0, Port-1, Port-4 |
| No disabled TBs | 4 | Port-0, Port-1, Port-2, Port-3 |
| One TB is disabled (NDI = 0 in disabled TB) | 4 | Port-0, Port-1, Port-2, Port-3 |
| One TB is disabled (NDI = 1 in disabled TB) | 4 | Port-0, Port-1, Port-4, Port-6 |
| No disabled TBs | 5 | Port-0, Port-1, Port-2, Port-3, Port-4 |

TABLE 10-continued

| TBs and NDI | Rank indication | Indicated DM RS index set |
|---|---|---|
| No disabled TBs | 6 | Port-0, Port-1, Port-2, Port-3, Port-4, Port-5 |
| No disabled TBs | 7 | Port-0, Port-1, Port-2, Port-3, Port-4, Port 5, Port-6 |
| No disabled TBs | 8 | Port-0, Port-1, Port-2, Port-3, Port-4, Port-5, Port-6, Port-7 |

As can be seen from Table 10, DMRS port(s) are allocated to layer(s), such that one or two CDM groups may be used for multi-layer single codeword transmission. For example, referring to Table 10, in the case of Rank-3 transmission, three layers constructing two TBs may be transmitted through Port-0, Port-1, and Port-2, or three layers constructing one TB may be transmitted through Port-0, Port-1, and Port-2, and three layers constructing one TB may be transmitted through Port-0, Port-1, and Port-4. The BS disables one TB, sets an NDI for the disabled TB to zero 0, and transmits the resultant data, such that it can be recognized that the three layers are transmitted through Port-0, Port-1, and Port-2. In addition, the BS disables one TB, sets an NDI for the disabled TB to '1', and transmits the resultant data, such that it can be recognized that the three layers are transmitted through Port-0, Port-1, and Port-2.

In accordance with the embodiments for indicating a DMRS port using an NDI, different information for indicating a DMRS port need not be additionally transmitted, resulting in reduction in downlink signaling overhead.

The above-mentioned embodiment in which DMRS port(s) used for single codeword transmission are changed using an NDI and the DMRS port(s) are indicated may be combined with the embodiments 1-1 to 5 as necessary. For example, not only an OCC used when each DMRS port spreads the corresponding DMRS, but also a CDM group for transmitting the corresponding DMRS may be determined according to any one of the embodiments 1-1 to 3.

The BS processor 400b according to the present invention enables only one available TB, and disables the remaining TB(s), such that it can allocate the resultant TBs to a UE. The BS processor 400b may inform the UE of disablement of the remaining TB(s) using downlink control information. For example, the BS processor 400b sets a predetermined value to an MCS and RV of the remaining TB(s) contained in downlink control information, such that the remaining TB(s) can be disabled. The BS processor 400b configures a codeword corresponding to one TB which is enabled, and controls the BS transmitter 100b, such that the BS transmitter 100b can transmit the codeword using one or more layers.

The BS processor 400b allocates an antenna port to each layer of the codeword, and controls the BS transmitter 100b in such a manner that the corresponding layer and DMRS can be transmitted at the allocated antenna port. The BS processor 400b sets a predetermined value to an NDI for the disabled TB, such that it can inform the UE of an antenna port set through which layer(s) of the codeword is transmitted. Referring to Table 10, if the UE feeds back Rank-3 transmission to the BS as rank information, the BS processor 400b sets the value of 1 to an NDI of the disabled TB, such that it is possible to perform signaling of information indicating that three layers allocated to the UE are transmitted through Port-0, Port-1 and Port-2.

Under the control of the BS processor 400b, the BS transmitter 100b transmits the downlink control information within a control region, and each layer of the codeword can be transmitted along with the corresponding DMRS through the allocated antenna port.

The receiver 300a of the UE receives the downlink control information, and transfers the received information to the UE processor 400a. Upon receiving the downlink control information, the UE processor 400a can recognize disablement of the remaining TBs other than one TB. That is, the UE processor 400a can recognize that a single codeword is transmitted to the UE on the basis of the control information. In addition, the UE processor 400a can recognize, on the basis of an NDI for each TB of the downlink control information, an antenna port set through which layer(s) for single codeword transmission are transmitted. The UE processor 400a can control the UE receiver 300a in such a manner that the corresponding DMRS can be detected from each antenna port of the antenna port set on the basis of the downlink control information. In addition, the UE processor 400a can control the UE receiver 300a in such a manner that the transmitted layer(s) can be detected and received on the basis of the detected DMRS(s). The UE processor 400a can recover the received layer(s) into the codeword.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The embodiments of the present invention can be applied to a BS, a UE, or other communication devices in a wireless communication system.

The invention claimed is:

1. A method for transmitting downlink data to a user equipment (UE) in a wireless communication system, the method comprising:
multiplexing a plurality of transmission layers for the downlink data in a resource allocation unit, the resource allocation unit including a plurality of contiguous subcarriers and a plurality of orthogonal frequency division multiplexing (OFDM) symbols;
transmitting the transmission layers and demodulation reference signals (DMRSs) of the transmission layers to the UE,
wherein the DMRSs are transmitted through a predetermined first time-frequency resource set of the resource allocation unit and a predetermined second time-frequency resource set of the resource allocation unit, the second time-frequency resource set separate from the first time-frequency resource set,
wherein each of the DMRSs is transmitted in the first time-frequency resource set or the second time-frequency resource set using one of predetermined orthogonal cover codes (OCCs) according to a predefined mapping rule, and
wherein the predefined mapping rule maps each of 8 DMRSs for 8 transmission layers to one of the first and second time-frequency resource sets and to one of the predetermined OCCs.

2. The method according to claim 1, wherein the predefined mapping rule maps DMRSs for layers 0, 1, 4 and 6 of the 8 layers to the first time-frequency resource set and DMRSs for layers 2, 3, 5 and 7 of the 8 layers to the second time-frequency resource set.

3. The method according to claim 1, wherein the predetermined OCCs have a length-4.

4. The method according to claim 1, wherein the predefined mapping rule maps DMRSs mapped to a same time-frequency resource set to different OCCs available to the same time-frequency resource set.

5. A method for receiving downlink data by a user equipment (UE) in a wireless communication system, the method comprising:
   receiving, by the UE, a plurality of transmission layers for the downlink data and demodulation reference signals (DMRSs) of the transmission layers on a resource allocation unit, the resource allocation unit including a plurality of contiguous subcarriers and a plurality of orthogonal frequency division multiplexing (OFDM) symbols; and
   demodulating, by the UE, the downlink data based on the DMRSs,
   wherein the DMRSs are received through a predetermined first time-frequency resource set of the resource allocation unit and a predetermined second time-frequency resource set of the resource allocation unit, the second time-frequency resource set separate from the first time-frequency resource set,
   wherein each of the DMRSs is received in the first time-frequency resource set or the second time-frequency resource set using one of predetermined orthogonal cover codes (OCCs) according to a predefined mapping rule, and
   wherein the predefined mapping rule maps each of 8 DMRSs for 8 transmission layers to one of the first and second time-frequency resource sets and to one of the predetermined OCCs.

6. The method according to claim 5, wherein the predefined mapping rule maps DMRSs for layers 0, 1, 4 and 6 of the 8 layers to the first time-frequency resource set and DMRSs for layers 2, 3, 5 and 7 of the 8 layers to the second time-frequency resource set.

7. The method according to claim 5, wherein the predetermined OCCs have a length-4.

8. The method according to claim 5, wherein the predefined mapping rule maps DMRSs mapped to a same time-frequency resource set to different OCCs available to the same time-frequency resource set.

9. A base station (BS) for transmitting downlink data to a user equipment (UE) in a wireless communication system, the BS comprising:
   a transmitter configured to transmit the downlink data to the UE; and
   a processor configured to:
      multiplex a plurality of transmission layers for the downlink data in a resource allocation unit, the resource allocation unit including a plurality of contiguous subcarriers and a plurality of orthogonal frequency division multiplexing (OFDM) symbols, and
      control the transmitter to transmit the transmission layers and demodulation reference signals (DMRSs) of the transmission layers to the UE,
   wherein the DMRSs are transmitted through a predetermined first time-frequency resource set of the resource allocation unit and a predetermined second time-frequency resource set of the resource allocation unit, the second time-frequency resource set separate from the first time-frequency resource set,
   wherein each of the DMRSs is transmitted in the first time-frequency resource set or the second time-frequency resource set using one of predetermined orthogonal cover codes (OCCs) according to a predefined mapping rule, and
   wherein the predefined mapping rule maps each of 8 DMRSs for 8 transmission layers to one of the first and second time-frequency resource sets and to one of the predetermined OCCs.

10. The BS according to claim 9, wherein the predefined mapping rule maps DMRSs for layers 0, 1, 4 and 6 of the 8 layers to the first CDM group and DMRSs for layers 2, 3, 5 and 7 of the 8 layers to the second CDM group.

11. The BS according to claim 9, wherein the predetermined OCCs have a length-4.

12. The BS according to claim 9, wherein the predefined mapping rule maps each of DMRSs mapped to a same CDM group to different one of OCCs available to the same CDM group.

13. A user equipment (UE) for receiving downlink data in a wireless communication system, the UE comprising:
   a receiver; and
   a processor configured to:
      control the receiver to receive a plurality of transmission layers for the downlink data and demodulation reference signals (DMRSs) of the transmission layers on a resource allocation unit, the resource allocation unit including a plurality of contiguous subcarriers and a plurality of orthogonal frequency division multiplexing (OFDM) symbols, and
      demodulate the downlink data based on the DMRSs,
   wherein the DMRSs are received through a predetermined first time-frequency resource set of the resource allocation unit and a predetermined second time-frequency resource set of the resource allocation unit, the second time-frequency resource set separate from the first time-frequency resource set,
   wherein each of the DMRSs is received in the first time-frequency resource set or the second time-frequency resource set using one of predetermined orthogonal cover codes (OCCs) according to a predefined mapping rule, and
   wherein the predefined mapping rule maps each of 8 DMRSs for 8 transmission layers to one of the first and second time-frequency resource sets and to one of the predetermined OCCs.

14. The UE according to claim 13, wherein the predefined mapping rule maps DMRSs for layers 0, 1, 4 and 6 of the 8 layers to the first time-frequency resource set and DMRSs for layers 2, 3, 5 and 7 of the 8 layers to the second time-frequency resource set.

15. The UE according to claim 13, wherein the predetermined OCCs have a length-4.

16. The UE according to claim 13, wherein the predefined mapping rule maps DMRSs mapped to a same time-frequency resource set to different OCCs available to the same time-frequency resource set.

* * * * *